United States Patent
Odagaki

(10) Patent No.: US 12,440,885 B2
(45) Date of Patent: Oct. 14, 2025

(54) METHOD OF MANUFACTURING BOTTOMED CONTAINER, AND PRESS SYSTEM

(71) Applicant: FUJI SPRINGS CO., INC., Asago (JP)

(72) Inventor: Toshihiro Odagaki, Asago (JP)

(73) Assignee: FUJI SPRINGS CO., INC., Asago (JP)

( * ) Notice: Subject to any disclaimer, the term of this patent is extended or adjusted under 35 U.S.C. 154(b) by 0 days.

(21) Appl. No.: 18/864,387

(22) PCT Filed: May 23, 2024

(86) PCT No.: PCT/JP2024/018947
§ 371 (c)(1),
(2) Date: Nov. 8, 2024

(87) PCT Pub. No.: WO2025/047013
PCT Pub. Date: Mar. 6, 2025

(65) Prior Publication Data
US 2025/0170633 A1    May 29, 2025

(30) Foreign Application Priority Data
Aug. 29, 2023 (JP) ................................. 2023-138801

(51) Int. Cl.
*B21D 22/28* (2006.01)
*B21D 51/18* (2006.01)

(52) U.S. Cl.
CPC ............ *B21D 22/28* (2013.01); *B21D 51/18* (2013.01)

(58) Field of Classification Search
CPC ........ B21D 22/21; B21D 22/26; B21D 22/28; B21D 24/005
(Continued)

(56) References Cited

U.S. PATENT DOCUMENTS

| | | | | |
|---|---|---|---|---|
| 858,172 | A | * 6/1907 | Godfrey | B31B 50/46 |
| | | | | 72/348 |
| 3,263,637 | A | * 8/1966 | Cox | B21D 22/26 |
| | | | | 72/347 |
| 4,870,846 | A | * 10/1989 | Budrean | B21D 17/02 |
| | | | | 72/354.8 |

FOREIGN PATENT DOCUMENTS

JP   2001150043 A   6/2001
JP   2002170529 A   6/2002
(Continued)

OTHER PUBLICATIONS

WIPO, International Search Report issued on Aug. 13, 2024 for PCT application No. PCT/JP2024/018947.
(Continued)

*Primary Examiner* — Christopher L Templeton
*Assistant Examiner* — P Derek Pressley
(74) *Attorney, Agent, or Firm* — Li & Cai Intellectual Property (USA) Office

(57) ABSTRACT

To suppress warping at a bottom of a workpiece when manufacturing a bottomed box-section cylindrical container by molding a workpiece from a flat plate state to a box-section cylindrical shape state having a bottom by performing multiple press-drawing steps by using multiple molds each having a long-hole-shaped shaping hole. A first press-drawing step is performed using a first mold having a first shaping hole having a long hole shape. A second press-drawing step is performed using a second mold having a second shaping hole having a long hole shape, and is configured as a next press-drawing step after the first press-drawing step. The first shaping hole is formed with a larger dimension in a width direction perpendicular to a longitudinal direction than the second shaping hole, and is formed tapering inward in the width direction from both end sides to the center side in the longitudinal direction.

6 Claims, 14 Drawing Sheets

(58) Field of Classification Search
USPC .................................. 72/347, 348, 349, 350
See application file for complete search history.

(56) References Cited

FOREIGN PATENT DOCUMENTS

| | | | |
|---|---|---|---|
| JP | 2003326323 | A | 11/2003 |
| JP | 2007260740 | A | 10/2007 |
| JP | 201156530 | A | 3/2011 |
| JP | 2012210641 | A | 11/2012 |
| JP | 201851575 | A | 4/2018 |
| JP | 7355424 | B1 | 10/2023 |

OTHER PUBLICATIONS

Japan Patnent Office, Decision to Grant a Patent issued on Mar. 5, 2024 regarding Japanese patent application No. 2023-138801.
Hiromi Yoshida, "Complete Guide to Press Processing", Nikkan Kogyo Shinbun, Sep. 2015, pp. 94-95.

\* cited by examiner (A)

(B)

METHOD OF MANUFACTURING BOTTOMED CONTAINER, AND PRESS SYSTEM

FIELD OF THE DISCLOSURE

The present invention relates to a method of manufacturing a bottomed container and a press system for forming a bottomed box-section cylindrical container, by molding a workpiece from a flat plate state to a bottomed cylindrical shape state with a bottom by performing multiple press-drawing steps.

BACKGROUND OF THE DISCLOSURE

In press forming, a workpiece is processed using a mold including a die with a shaping hole and a punch that pushes the workpiece into the die's shaping hole. When forming a bottomed box-section cylindrical container having a shape with a cross-section that has a longitudinal direction and a bottom, press forming is used to form the bottomed box-section cylindrical container from a flat plate by performing multiple press-drawing steps by using multiple molds that have long hole-shaped shaping holes. For example, Non-patent Document 1 discloses a press forming method for forming a bottomed box-section cylindrical container having a substantially rectangular cross-section from a flat plate by performing multiple press-drawing steps by using multiple molds that have long hole-shaped shaping holes.

As described in Non-patent Document 1, the bottomed box-section cylindrical container is formed and manufactured from a flat plate by performing multiple press-drawing steps using multiple molds that each have a long hole-shaped shaping hole. In some cases, the shape of the formed bottomed container after the multiple press-drawing steps defines the final shape of the product, but in other cases, after the multiple press-drawing steps are complete, a further ironing process is performed on the formed bottomed box-section cylindrical container. In the ironing process after the multiple press-drawing steps performed, on the formed bottomed box-section cylindrical container, an ironing die is used to iron the wall of the bottomed container and reduce the thickness of the wall to define the final shape of the product.

As described in Non-patent Document 1, when forming the bottomed box-section cylindrical container having a substantially rectangular cross-section, a mold with a shaping hole having an elliptical shape that does not have a straight section and expands outward is used in the press-drawing steps other than the final press-drawing step of the multiple press-drawing steps. In other words, in intermediate press-drawing steps other than the final press-drawing step that defines the final shape of the product, or a shape corresponding to the final shape of the product, the shape of the long-hole-shaped shaping hole in the mold is formed into a shape that smoothly connects in a circular arc shape over the entire circumference and expands into an elliptical shape.

When performing press-drawing using a mold with a long-hole-shaped shaping hole, a compressive force is generated in a part of the workpiece processed at both ends in the longitudinal direction, which is the direction in which the shaping hole extends in the form of a long hole. Conversely, if the part that extends along the longitudinal direction of the long-hole-shaped shaping hole is formed in a straight line, the part of the workpiece that is processed at the center of the shaping hole in the longitudinal direction will be in a state where bending is applied without any circumferential force being generated. In this case, the workpiece is in a state where compressive force acts from parts of the workpiece processed at both ends in the longitudinal direction to the part of the workpiece that is processed at the center in the longitudinal direction. In other words, since compressive force is generated at the parts of the workpiece processed at both ends in the longitudinal direction, compressive force is also generated at the center in the longitudinal direction in a state where the workpiece is to be bent. Accordingly, buckling occurs at the part processed at the center in the longitudinal direction, and wrinkles are likely to occur. Therefore, as disclosed in Non-patent Document 1, when press-drawing is performed using a mold with a long-hole-shaped shaping hole in press-drawing steps other than the final process, a mold with a shaping hole having an elliptical shape that expands outward over the entire circumference is used. Using a mold with an elliptical shaping hole means that, when the workpiece is pressed and drawn, compressive force is applied not only to the parts being processed at both ends in the longitudinal direction but also to parts being processed at the center in the longitudinal direction. As a result, compression force is generated around the entire circumference of the workpiece, and buckling is less likely to occur at the part processed at the center in the length direction, which helps to suppress wrinkling.

PRIORITY ART DOCUMENTS

Non-Patent Documents

Non-patent Document 1: Complete Collection of Press Machining, Hiromi Yoshida, Nikkan Kogyo Shimbun Ltd., September 2015, pp. 94-95 (Japanese only)

PROBLEMS TO BE SOLVED

In a press-drawing step using a mold having a long-hole-shaped shaping hole, using a mold having a shaping hole expanding in an elliptical shape causes a compression force to be generated around the entire circumference of the workpiece in the circumferential direction, and can suppress wrinkling due to buckling at the center of the workpiece in the longitudinal direction. However, the amount of drawing at both ends of the workpiece in the longitudinal direction is large, and plastic flow of the material occurs from both ends in the longitudinal direction to the center. Accordingly, the volume of the material at the center of the workpiece in the longitudinal direction becomes excessive in a state where the circumferential compressive force is generated even in a part of the workpiece processed at the center in the long direction. As a result, the material at the center in the longitudinal direction, which has an excessive volume, will flow to the bottom of the workpiece, which is not constrained by the punch and die of the mold. This can cause warping to occur easily at the bottom part of the center of the workpiece in the longitudinal direction after press-drawing, which is a problem. Additionally, once warping occurs at the central part in the longitudinal direction on the bottom side of the bottomed container, which is the workpiece, that has been formed after multiple press-drawing steps and the ironing process is performed after the multiple press-drawing steps, the container will be overall warped and have abnormal dimensions. More specifically, if there is warping at the bottom of the central part in the longitudinal direction after the multiple press-drawing steps, and the ironing process is carried out in that state, not only the bottom part of the bottomed container but also the walls of the bottomed container will be warped, and dimensional abnormalities occur in the corners of the bottom of the bottomed container. Therefore, if a press forming involving multiple press-drawing steps is followed by a further ironing process, there is a problem that the warping of the bottom of the workpiece will cause warping of the walls of the bottomed container and cause dimensional abnormalities in the corners of the bottom of the bottomed container after the ironing process.

SUMMARY OF THE DISCLOSURE

The present invention has been made in view of the above-described technical problems, and an object thereof is to provide a method of manufacturing a bottomed container and a press system which can suppress warping at a bottom of a workpiece when manufacturing a bottomed box-section cylindrical container by molding a workpiece from a flat plate state to a bottomed cylindrical shape state by performing multiple press-drawing steps by using multiple molds each having a long-hole-shaped shaping hole.

Means for Solving Problems

A first aspect is a method of manufacturing a bottomed container of the present invention, for manufacturing a bottomed box-section cylindrical container by molding a workpiece from a flat plate state to a cylindrical shape state having a bottom by performing multiple press-drawing steps by using multiple molds each having a long-hole-shaped shaping hole, the method comprising:

a first press-drawing step configured as at least one press-drawing step of the multiple press-drawing steps, excluding a final press-drawing step, the first press-drawing step being performed by using a first mold including a die including a first shaping hole as the long-hole-shaped shaping hole and a punch configured to push the workpiece into the first shaping hole; and a second press-drawing step configured as a press-drawing step following the first press-drawing step of the multiple press-drawing steps, the second press-drawing step being performed by using a second mold including a second shaping hole as the long-hole-shaped shaping hole, wherein the first shaping hole is formed having a larger dimension in a width direction than the second shaping hole along an entire length of the first shaping hole in an up-down direction, the width direction being a direction perpendicular to a longitudinal direction in which the first shaping hole extends in a long hole shape, the up-down direction being a direction in which the first shaping hole extends through the die, the first shaping hole is formed to taper inward in the width direction from both end sides to the center side in the longitudinal direction along the entire length of the first shaping hole in the up-down direction, and an outer peripheral shape of the punch is formed in a shape corresponding to the first shaping hole, and a cross-sectional shape of the punch is formed curved and recessed inward in a direction parallel to the width direction from both end sides to the center side in a direction parallel to the longitudinal direction.

According to the above-described first aspect of the method of manufacturing a bottomed container, the first shaping hole is formed tapering inward in the width direction from both end sides to the center side in the longitudinal direction within a range in which the dimension in the width direction is larger than the dimension in the width direction of the second shaping hole. With this configuration, in the first press-drawing step, a tensile force is generated in the circumferential direction of the first shaping hole at a portion of the workpiece that is processed at the center of the first shaping hole in the longitudinal direction. Thus, in the workpiece, the circumferential tensile force generated at the portion processed at the center of the first shaping hole in the longitudinal direction opposes compressive force generated at portions processed at both ends of the first shaping hole in the longitudinal direction. This suppresses the volume of the material processed at the center of the first shaping hole in the longitudinal direction from becoming excessive and suppresses plastic flow toward the bottom of the workpiece. In addition, the first shaping hole is formed tapering inward in the width direction from both end sides to the center side in the longitudinal direction over the entire length in the up-down direction within a range in which the dimension in the width direction is larger than the dimension in the width direction of the second shaping hole. As a result, forces acting on the workpiece at both ends and in the center of the first shaping hole are adjusted across the entire workpiece during the first press-drawing step, and the volume of material processed at the center of the first shaping hole is suppressed from becoming excessive over the entire length in the up-down direction, thereby suppressing plastic flow to the bottom of the workpiece. In the second press-drawing step, after plastic flow to the bottom is suppressed by suppressing an excess of volume at the center in the longitudinal direction, the workpiece is passed through the second shaping hole, which has a smaller dimension in the width direction than the first shaping hole, and is pressed and drawn to form a box-section cylinder state or a state of shape close to a box-section cylinder. After undergoing the final press-drawing step, the workpiece is finally formed into a box-section cylindrical shape state. In this way, with the method of manufacturing a bottomed container as described in the first aspect above, in the first press-drawing step, the volume is suppressed from becoming excessive at the center in the longitudinal direction and plastic flow to the bottom is suppressed. Further, in the second press-drawing step, the workpiece is pressed and formed into a cylindrical shape state or a state of shape close to a box-section cylinder shape by drawing the workpiece in the width direction. Accordingly, with the method of manufacturing a bottomed container described in the first aspect above, warping at the center of the workpiece in the longitudinal direction can be suppressed. In addition, in the method of manufacturing a bottomed container described above in the first aspect, the circumferential tensile force generated at the portion processed at the center in the longitudinal direction opposes the circumferential compressive force generated at the portions processed at both ends in the longitudinal direction, so buckling and wrinkling can also be suppressed at the portion processed at the center in the longitudinal direction. Note that, the "width direction" is a direction perpendicular to the "longitudinal direction, which is the direction in which the shaping hole extends in a long hole shape", and is a direction perpendicular to both the "longitudinal direction" and the "up-down direction". Further, the phrase "direction in which the shaping hole extends in a long hole shape" is equivalent to the phrase "direction in which the shaping hole is extending in a long hole shape".

According to the above-described first aspect of the method of manufacturing a bottomed container, warping at the bottom of the workpiece can be suppressed when manufacturing a bottomed box-section cylindrical container by molding a workpiece from a flat plate state to a box-section cylindrical shape state having a bottom by performing multiple press-drawing steps by using multiple molds each having a long-hole-shaped shaping hole.

A second aspect is the method of manufacturing a bottomed container of the present invention wherein
   the first press-drawing step is preferably configured as an initial press-drawing step of the multiple press-drawing steps.

In an initial press-drawing step of performing a press-drawing process on a workpiece in a flat plate state, the compressive force generated at portions processed at both ends of the shaping hole in the longitudinal direction is large. However, according to the above-described second aspect of the method of manufacturing a bottomed container, in the initial press-drawing step, it is possible to generate circumferential tensile force at the portion processed at the center in the longitudinal direction of the shaping hole to oppose the circumferential compressive force generated at the portions processed at both ends of the shaping hole in the longitudinal direction. Thus, even during the initial press-drawing step in which warping is likely to occur at the bottom of the workpiece, warping can be effectively suppressed at the bottom of the workpiece.

A third aspect is the method of manufacturing a bottomed container of the present invention, wherein
   the first shaping hole is preferably formed tapered while curving inward in the width direction from both end sides to the center side in the longitudinal direction, and is preferably formed most tapered inward in the width direction at a center position in the longitudinal direction.

According to the above-described third aspect of the method of manufacturing a bottomed container, it is possible to generate circumferential tensile force at the portion processed at the center in the longitudinal direction to more evenly oppose the circumferential compressive force generated at the portions processed at both ends in the longitudinal direction. Thus, warping can be effectively suppressed at the bottom of the workpiece.

A fourth aspect is a press system of the present invention for forming a bottomed box-section cylindrical container by molding a workpiece from a flat plate state to a box-section cylindrical shape state having a bottom by performing multiple press-drawing steps by using multiple molds each having a long-hole-shaped shaping hole, the press system comprising:
   a first press unit including:
   a first mold including a die having a first shaping hole as the long-hole-shaped shaping hole, and a punch configured to press the workpiece into the first shaping hole,
   the first press unit being configured to perform a first press-drawing step configured as at least one press-drawing step of the multiple press-drawing steps, excluding a final press-drawing step by using the first mold; and
   a second press unit including a second mold having a second shaping hole as the long-hole-shaped shaping hole, and being configured to perform a second press-drawing step configured as a press-drawing step following the first press-drawing step of the multiple press-drawing steps by using the second mold, wherein
   the first shaping hole is formed having a larger dimension in a width direction than the second shaping hole along an entire length of the first shaping hole in an up-down direction, the width direction being a direction perpendicular to a longitudinal direction in which the first shaping hole extends in a long hole shape, the up-down direction being a direction in which the first shaping hole extends through the die,
   the first shaping hole is formed to taper inward in the width direction from both end sides to the center side in the longitudinal direction along the entire length of the first shaping hole in the up-down direction, and
   an outer peripheral shape of the punch is formed in a shape corresponding to the first shaping hole, and a cross-sectional shape of the punch is formed curved and recessed inward in a direction parallel to the width direction from both end sides to the center side in a direction parallel to the longitudinal direction.

According to the above-described fourth aspect of the press system, the first shaping hole placed on the first mold of the first press unit is formed tapering inward in the width direction from both end sides to the center side in the longitudinal direction within a range in which the dimension in the width direction is larger than the dimension in the width direction of the second shaping hole placed on the second mold of the second press unit. With this configuration, when the first press-drawing step is performed by the first press unit, a tensile force is generated in the circumferential direction of the first shaping hole at a portion of the workpiece that is processed at the center of the first shaping hole in the longitudinal direction. Thus, in the workpiece, the circumferential tensile force generated at the portion processed at the center of the first shaping hole in the longitudinal direction opposes compressive force generated at portions processed at both ends of the first shaping hole in the longitudinal direction. This suppresses the volume of the material processed at the center of the first shaping hole in the longitudinal direction from becoming excessive and suppresses plastic flow toward the bottom of the workpiece. In addition, the first shaping hole is formed tapering inward in the width direction from both end sides to the center side in the longitudinal direction over the entire length in the up-down direction within a range in which the dimension in the width direction is larger than the dimension in the width direction of the second shaping hole. As a result, forces acting on the workpiece at both ends and in the center of the first shaping hole are adjusted by performing the first press-drawing step, and the volume of material processed at the center of the first shaping hole is suppressed from becoming excessive over the entire length in the up-down direction, thereby suppressing plastic flow to the bottom of the workpiece. When the second press-drawing step is performed by the second press unit, after plastic flow to the bottom is suppressed by suppressing an excess of volume at the center in the longitudinal direction, the workpiece is passed through the second shaping hole, which has a smaller dimension in the width direction than the first shaping hole, and is pressed and drawn to form a box-section cylinder or a shape close to a box-section cylinder. After undergoing the final press-drawing step, the workpiece is finally formed into a box-section cylinder shape. In this way, with the press system as described in the fourth aspect above, in the first press-drawing step performed by the first press unit, the volume is suppressed from becoming excessive at the center in the longitudinal direction and plastic flow to the bottom is suppressed before the workpiece is subject to press forming. Further, in the second press-drawing step performed by the second press unit, the workpiece is pressed and formed into a box-section cylinder shape state or a state of shape close to a box-section cylinder shape state by drawing the workpiece in the width direction. Accordingly, with the press system described in the fourth aspect above, warping at the center of the workpiece in the longitudinal direction can be suppressed. In addition, in the press system described above in the fourth aspect, the circumferential tensile force generated at the portion processed at the center in the longitudinal direction opposes the circumferential compressive force generated at the portions processed at both ends in the longitudinal direction, so buckling and wrinkling can also be suppressed at the portion processed at the center in the longitudinal direction. Note that, the "width direction" is a direction perpendicular to the "longitudinal direction, which is the direction in which the shaping hole extends in a long hole shape", and is a direction perpendicular to both the "longitudinal direction" and the "up-down direction". Further, the phrase "direction in which the shaping hole extends in a long hole shape" is equivalent to the phrase "direction in which the shaping hole is extending in a long hole shape".

According to the above-described fourth aspect of the press system, warping at the bottom of the workpiece can be suppressed when manufacturing a box-section bottomed cylindrical container by molding a workpiece from a flat plate state to a box-section cylinder shape state having a bottom by performing multiple press-drawing steps by using multiple molds each having a long-hole-shaped shaping hole.

A fifth aspect is the press system of the present invention in the above-described fourth aspect, wherein
the first press unit preferably performs the first press-drawing step configured as the initial press-drawing step of the multiple press-drawing steps by using the first mold.

In an initial press-drawing step of performing a press-drawing process on a workpiece in a flat plate state, the compressive force generated at portions processed at both ends of the shaping hole in the longitudinal direction is large. However, according to the above-described fifth aspect of the press system, when the initial press-drawing step is performed by the first press unit, it is possible to generate circumferential tensile force at the portion processed at the center in the longitudinal direction of the shaping hole to oppose the circumferential compressive force generated at the portions processed at both ends of the shaping hole in the longitudinal direction. Thus, even during the initial press-drawing step in which warping is likely to occur at the bottom of the workpiece, warping can be effectively suppressed at the bottom of the workpiece.

A sixth aspect is the press system of the present invention in the above-described fourth aspect, wherein
the first shaping hole is preferably formed tapered while curving inward in the width direction from both end sides to the center side in the longitudinal direction, and is preferably formed most tapered inward in the width direction at a center position in the longitudinal direction.

According to the above-described sixth aspect of the press system, it is possible to generate circumferential tensile force at the portion processed at the center in the longitudinal direction to more evenly oppose the circumferential compressive force generated at the portions processed at both ends in the longitudinal direction. Thus, warping can be effectively suppressed at the bottom of the workpiece.

Advantageous Effects of the Invention

According to the present invention, it is possible to provide a method of manufacturing a bottomed container and a press system which can suppress warping at a bottom of a workpiece when manufacturing a box-section bottomed cylindrical container by molding a workpiece from a flat plate state to a box-section cylinder shape state having a bottom by performing multiple press-drawing steps by using multiple molds each having a long-hole-shaped shaping hole.

BRIEF DESCRIPTION OF THE DRAWINGS

FIG. 4 is a view showing an example of a first mold used in a first press-drawing step in the method of manufacturing a bottomed container, and also shows an example of the first mold of a first press unit in the press system, in which: FIG. 4(A) is a cross-sectional plan view showing a punch in the first mold; FIG. 4(B) is a plan view of a die in the first mold; and FIG. 4(C) is a cross-sectional view taken along the arrow A-A in FIG. 4(B).

FIG. 5 is a view showing an example of a second mold used in a second press-drawing step in the method of manufacturing a bottomed container, and also shows an example of the second mold of a second press unit in the press system, in which: FIG. 5(A) is a cross-sectional plan view showing a punch in the second mold; FIG. 5(B) is a plan view of a die in the second mold; and FIG. 5(C) is a cross-sectional view taken along the arrow B-B in FIG. 5(B).

FIG. 9 is a view for explaining a conventional press-drawing step, in which: FIG. 9(A) is a plan view of a die; FIG. 9(B) is a cross-sectional view showing a state where a workpiece is undergoing a drawing process; and FIG. 9(C) is an enlarged view of the portion D surrounded by the dashed line in FIG. 9(B).

FIG. 10 is a view for explaining the first press-drawing step in the method of manufacturing a bottomed container and the first press-drawing step performed by the first press unit in the press system, in which: FIG. 10(A) is a plan view of the die; FIG. 10(B) is a cross-sectional view showing a state where the workpiece is undergoing a drawing process; and FIG. 10(C) is an enlarged view of the portion F surrounded by the dashed line in FIG. 10(B).

FIG. 11 is a view for explaining external features of the manufactured bottomed container, in which: FIG. 11(A) is a view for explaining external features of a bottomed container manufactured by a conventional method of manufacturing a bottomed container; and FIG. 11(B) is a view for explaining external features of the bottomed container manufactured by the method of manufacturing a bottomed container according to the embodiment.

FIG. 13 is a view showing an example of a mold used in the press-drawing step in the method of manufacturing a bottomed container according to the modified embodiment, and shows an example of a mold in the press system according to the modified embodiment, in which: FIG. 13(A) is a cross-sectional plan view of a punch and a plan view of a die in a mold used in a first press-drawing step; FIG. 13(B) is a cross-sectional plan view of a punch and a plan view of a die in a mold used in a second press-drawing step; and FIG. 13(C) is a cross-sectional plan view of a punch and a plan view of a die in a mold used in a third press-drawing step.

DETAILED DESCRIPTION OF THE EXEMPLARY EMBODIMENTS

Hereinafter, embodiments of the present invention will be described with reference to the drawings. Note that, the present invention can be broadly applied to a variety of different applications as a method of manufacturing a bottomed container, in which a box-section bottomed cylindrical container is manufactured by molding a workpiece from a flat plate state to a box-section cylinder shape state having a bottom by performing multiple press-drawing steps by using multiple molds each having a long-hole-shaped shaping hole. Further, the present invention can be broadly applied to a variety of different applications as a press system for forming a box-section bottomed cylindrical container by molding a workpiece from a flat plate state to a box-section cylinder shape state having a bottom by performing multiple press-drawing steps by using multiple molds each having a long-hole-shaped shaping hole. In the following description, first, the overall configuration of a press system and a method of manufacturing a bottomed container according to an embodiment of the present invention will be described, and then characteristic configurations of the press system and the method of manufacturing a bottomed container according to the embodiment of the present invention will be described.

1. Outline of Press System

Figure 1:
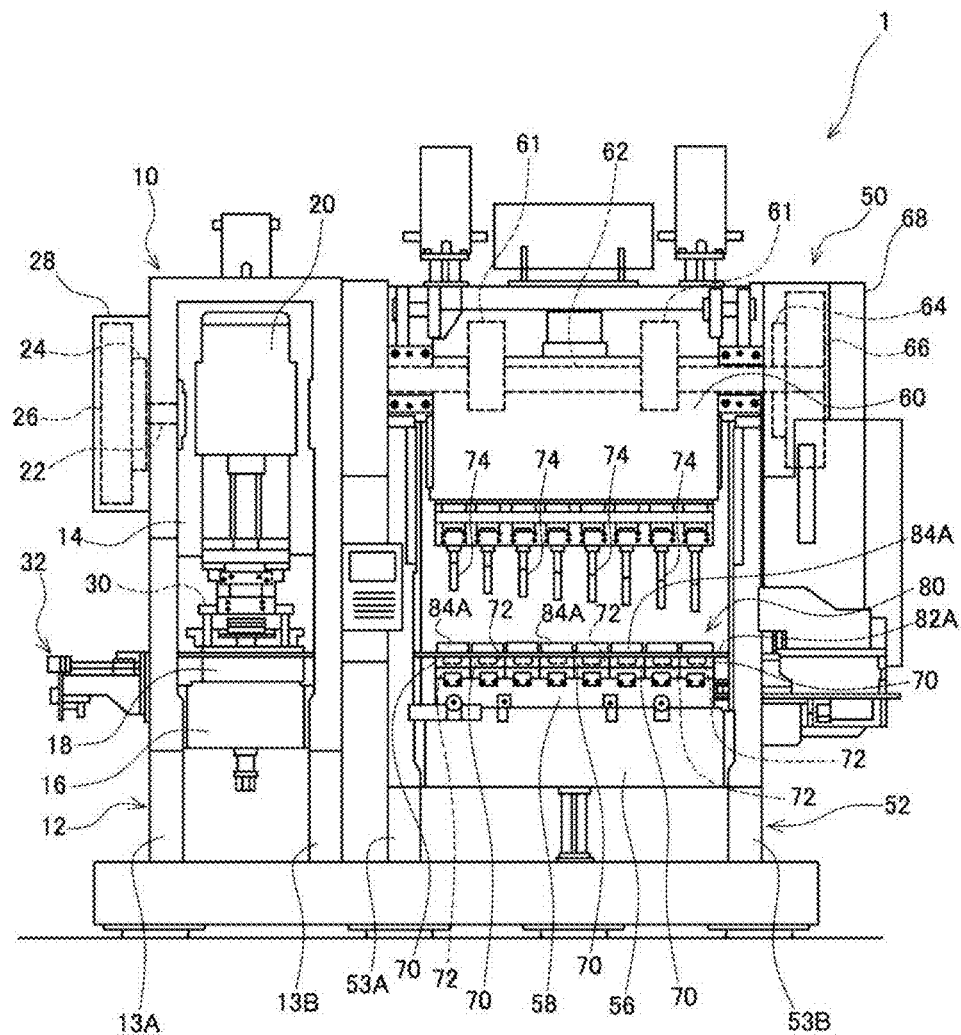
FIG. 1 shows the example of a press system according to an embodiment.
Figure 1:
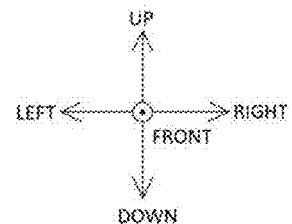
Figure 2:
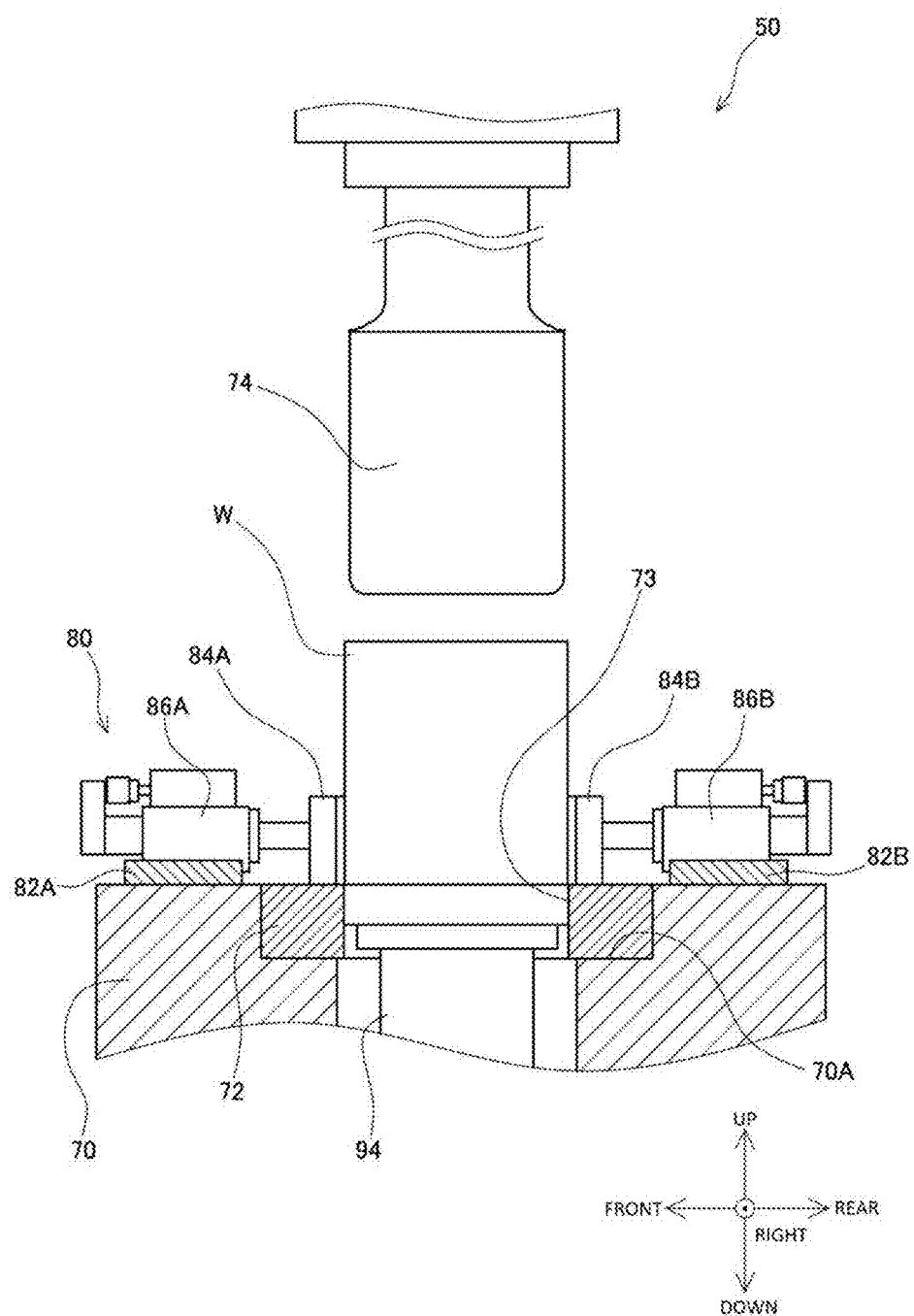
FIG. 2 is a cross-sectional side view showing a transfer press device of the press system, and is an enlarged view showing a portion of the transfer press device.

FIG. 1 shows an example of a press system 1 according to an embodiment of the present invention. FIG. 2 is a cross-sectional side view showing a transfer press device 50 of the press system 1, and is an enlarged view showing a portion of the transfer press device 50. For convenience of description, the up-down direction, left-right direction, and front-rear direction are as defined in FIGS. 1 and 2.

As shown in FIG. 1, the press system 1 includes a workpiece supply device 10 and the transfer press device 50. In this embodiment, the workpiece supply device 10 is disposed on the left, and the transfer press device 50 is disposed on the right. The workpiece supply device 10 supplies a workpiece W to the transfer press device 50.

The workpiece supply device 10 is a device that supplies the workpiece W (refer to FIGS. 4 and 6(A) described later) to the transfer press device 50, and is disposed adjacent to an upstream side of the transfer press device 50 in a workpiece transfer direction. The workpiece supply device 10 includes a frame 12 configured by a pair of side walls 13A and 13B that stand upright and are opposed to each other in the left-right direction. The frame 12 has a structure in which a ram support wall 14, a bolster support wall 16, and other components are laid between the pair of side walls 13A and 13B. Note that, a drive unit 32 configured to drive a pair of rails 82A and 82B (see FIG. 2) is disposed on a left side portion of the workpiece supply device 10.

The ram support wall 14 supports a ram 20 such that the ram 20 can move in the up-down direction, that is, the ram 20 can be raised and lowered. The ram 20 is able to move in the up-down direction by receiving power from a servomotor (not shown) via a camshaft 22. The ram 20 supports a punch (not shown). A left end portion of the camshaft 22 protrudes outward through the left side wall 13A of the pair of side walls 13A, 13B arranged opposing each other in the left-right direction. This part that protrudes outward through the left side wall 13A is linked to the above-mentioned servomotor (not shown) via a pulley 24 and a timing belt (not shown). When the camshaft 22 is rotated by the servomotor (not shown), the ram 20 moves up and down reciprocally. In addition to the pulley 24, a flywheel 26 is attached to the left end portion of the camshaft 22. Various components, including the pulley 24, the timing belt (not shown), and the flywheel 26, are covered by a side cover 28 fixed to an outer surface of the side wall 13A.

The bolster support wall 16 supports a die holder 30 via a bolster 18. The die holder 30 has a two-stage structure, with an upper stage and a lower stage. An upper surface of the lower stage of the die holder 30 is flush with an upper surface of a die holder 70 of the transfer press device 50, which will be described later. The upper stage of the die holder 30 is arranged above an upper surface of the lower stage with a gap between them. The die (not shown) is held in the upper stage of the die holder 30.

In the workpiece supply device 10, the ram 20 is moved downward to punch out the sheet metal using the punch and die (not shown) supported by the ram 20, thereby forming a workpiece W in flat plate state (see FIGS. 4 and 6(A) described below). After being formed by the work supply device 10, the workpiece W in flat plate state is supplied to the transfer press device 50.

As shown in FIG. 1, the transfer press device 50 is arranged adjacent to the downstream side of the workpiece supply device 10 in the workpiece transfer direction. The workpiece W in the flat state formed by the workpiece supply device 10 is transferred to the transfer press device 50, and the transfer press device 50 performs multiple press-drawing steps on the workpiece W.

The transfer press device 50 includes a frame 52 configured by a pair of side walls 53A and 53B that stand upright and oppose each other in the left-right direction. The frame 52 has a structure in which a ram support wall, a bolster support wall 56, and other components (not shown) are laid across the pair of side walls 53A and 53B.

The ram support wall (not shown) supports a ram 60 such that the ram 60 can move in the up-down direction, i.e., the ram 60 can be raised and lowered. The ram 60 is able to move up and down by receiving power from a servomotor (not shown) via a camshaft 62. The ram 60 also supports multiple punches 74 arranged along the left-right direction (i.e. the workpiece transfer direction). The camshaft 62 extends between the side walls 53A and 53B, above the ram support wall (not shown). The ram 60 is engaged with the cam 61 on the camshaft 62.

A right end portion of the camshaft 62 protrudes outward through the right side wall 53B of the pair of side walls 53A and 53B arranged opposing each other in the left-right direction. This part that protrudes outward through the right side wall 53B is linked to the above-mentioned servomotor (not shown) via the pulley 64 and the timing belt (not shown).

When the camshaft 62 is rotated by the servomotor (not shown), the ram 60 moves reciprocally in the up-down direction. In addition to the pulley 64, a flywheel 66 is attached to the right end portion of the camshaft 62. Various components, including the pulley 64, the timing belt (not shown), and the flywheel 66 are covered by a side cover 68 fixed to an outer face of the side wall 53B.

The bolster support wall 56 is inserted between lower end portions of the pair of side walls 53A and 53B, and the bolster 58 is fixed to an upper face of the bolster support wall 56. On the upper face of the bolster 58, multiple dies 72 (see FIGS. 1 and 2) are fixed via multiple die holders 70 arranged in the workpiece transfer direction. The number of dies 72 and the number of punches 74 is the same. A pair consisting of one die 72 and one punch 74 arranged above and below each other configures a mold used for one press-drawing step. In other words, each of the multiple pairs of die 72 and pairs of punch 74 arranged above and below each other constitutes a mold used for one of the multiple press-drawing steps.

As shown in FIGS. 1 and 2, the transfer press device 50 includes the multiple pairs of die 72 and punch 74, which constitute multiple molds arranged in the workpiece transfer direction. The multiple pairs of die 72 and punch 74 are arranged at a constant pitch in the left-right direction. As shown in FIG. 2, each die 72 is fixed to the die holder 70. The die holder 70 includes a step portion 70A formed at an upper face of the die holder 70. The die 72 is fixed to the step portion 70A of the die holder 70. In a state where the die 72 is fixed to the step portion 70A, a top face of the die holder 70 is flush with a top face of the die 72. The die 72 has a shaping hole 73 formed in the shape of a long hole when viewed in a plan view in the up-down direction. The press-drawing step is performed by the punch 74 pushing the workpiece W through the long hole-shaped shaping hole 73 in the die 72. By pushing the workpiece W into the long-hole-shaped shaping hole 73 of the die 72, the workpiece W is formed into a cylindrical shape with a long, narrow cross-section. Further, a knockout pin 94 is arranged below the shaping hole 73 of the die 72. When the punch 74 pushes the workpiece W into the shaping hole 73 of the die 72 to form the workpiece W, the knockout pin 94 pushes a bottom face of the workpiece W upward to restrict the workpiece W from bulging downwards. The knockout pin 94 can also push the workpiece W upward out of the shaping hole 73 of the die 72 when the punch 74 rises.

Transfer of the workpiece W downstream in the workpiece transfer direction is performed by the transfer device 80. The workpiece W is transferred downstream in the workpiece transfer direction by the transfer device 80, and press-drawing is performed by each of the multiple pairs of die 72 and punch 74 arranged in the left-right direction.

As shown in FIGS. 1 and 2, the transfer device 80 is arranged on the die holder 70, and includes a pair of rails 82A and 82B, multiple pairs of finger 84A and 84B, multiple pairs of air cylinder 86A and 86B serving as driving sources for driving each of the pairs of finger 84A and 84B, and the drive unit 32 (see FIG. 1) configured to operate the pair of rails 82A and 82B in the left-right direction.

The pair of rails 82A and 82B are arranged horizontally such that the left-right direction is the longitudinal direction, and are arranged extending over the multiple pairs of die 72 and punch 74. The pair of rails 82A and 82B are arranged in parallel with a certain distance in the front-rear direction. The pairs of finger 84A and 84B and the pairs of air cylinder 86A and 86B are placed on the pair of rails 82A and 82B in the up-down direction at positions corresponding to each pair of die 72 and punch 74. Thus, when the pair of rails 82A and 82B is moved in the left-right direction by the drive unit 32 (see FIG. 1), the multiple air cylinders 86A and 86B and the multiple fingers 84A and 84B also move in the left-right direction. In this way, the workpiece W that is held between the fingers 84A and 84B can be transferred downstream in the workpiece transfer direction. In FIG. 2, the workpiece W is shown being held between the fingers 84A and 84B.

As shown in FIG. 2, the fingers 84A and 84B are provided at leading end portions of rods of the air cylinders 86A and 86B, and are configured to open and close in response to operation of the air cylinders 86A and 86B, respectively. The front air cylinder 86A and the rear air cylinder 86B of the air cylinders 86A and 86B operate symmetrically in the front-rear direction. In other words, when the air cylinder 86A operates from the front to the rear, the air cylinder 86B operates from the rear to the front. At this time, the fingers 84A and 84B operate in directions approaching each other, i.e., from an open state to a closed state. Similarly, when the air cylinder 86A operates from the rear to the front, the air cylinder 86B operates from the front to the rear. At this time, the fingers 84A and 84B operate in directions separating from each other, i.e., from a closed state to an open state. By operating the fingers 84A and 84B to open and close in this way, the workpiece W can be released and held therebetween.

The distances between the fingers 84A and 84B, which are adjacent to each other in the workpiece transfer direction (i.e., the left-right direction), is the same constant pitch as the distance between the punches 74 (see FIG. 1) and the dies 72, which are adjacent to each other in the left-right direction. The drive unit 32 (see FIG. 1) synchronizes with the ascending/descending movement of the ram 60 (see FIG. 1) to repeat a reciprocating movement at a constant pitch in the left-right direction while maintaining a horizontal state for the pair of rails 82A and 82B. In addition, the multiple pairs of air cylinder 86A and 86B repeatedly open and close the fingers 84A and 84B such that the workpiece W is transferred by the reciprocating movement of the pair of rails 82A and 82B in the left-right direction. In this way, the workpiece W is transferred from upstream (i.e., the left side) in the workpiece transfer direction to downstream (i.e., the right side) in the workpiece transfer direction by the transfer device 80, and the press-drawing steps are performed in order by each of the multiple pairs of die 72 and punch 74. As a result, the workpiece W is subjected to multiple press-drawing steps.

When the press system 1 performs the multiple press-drawing steps on the workpiece W, the number of dies 72 and punches 74 used corresponds to the number of press-drawing steps to be performed. In the press system 1 illustrated in FIG. 1, an example is shown in which eight pairs of die 72 and punch 74 are provided. When eight press-drawing steps are performed on the workpiece W, eight pairs of die 72 and punch 74 are used. For example, when two press-drawing steps are performed on the workpiece W, only two pairs of die 72 and punch 74 are used. In other words, in this case, only two pairs of the eight pairs of die 72 and punch 74 are attached for use to the press system 1, and the other six pairs of die 72 and punch 74 are not mounted to the press system 1. Similarly, for example, if three press-drawing steps are to be performed on the workpiece W, only eight pairs of die 72 and punch 74 are used. In this case, only eight pairs of die 72 and punch 74 are attached for use to the press system 1, and the other five pairs of die 72 and punch 74 are not mounted to press system 1. Note that, at places where the dies 72 are not mounted to press system 1, for example, a block-shaped member without a shaping hole is attached.

The press system 1 according to this embodiment has the above-mentioned basic device configuration, and is provided as a press system for forming a box-section bottomed cylindrical container by molding a workpiece from a flat plate state to a box-section cylinder shape state having a bottom by performing multiple press-drawing steps by using multiple molds each having a long-hole-shaped shaping hole. Each of the multiple molds used in the multiple press-drawing steps performed by the press system 1 is composed of the die 72 and the punch 74. A long-hole-shaped shaping hole 73 is provided in the die 72 of each of the multiple molds.

Figure 3:
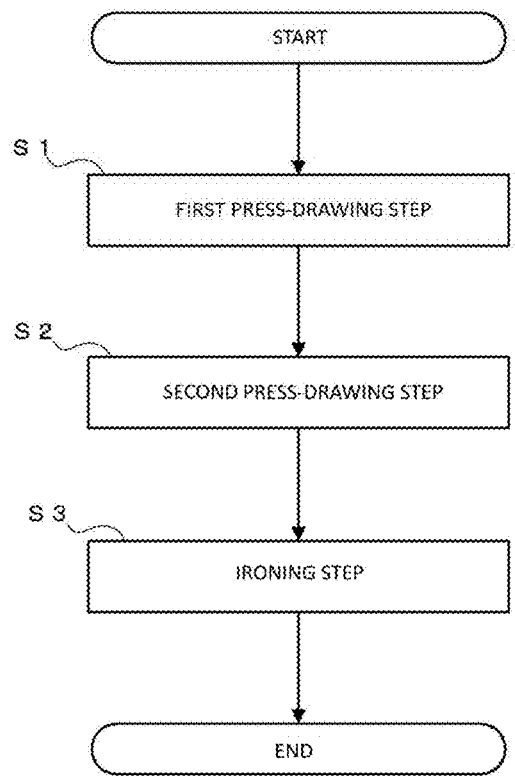
FIG. 3 is a flowchart showing an example of a method of manufacturing a bottomed container according to the embodiment, and shows an example of multiple press-drawing steps performed by the press system.

As the multiple press-drawing steps performed by the press system 1, two press-drawing steps may be performed, or three or more press-drawing steps may be performed. FIG. 3 is a flowchart showing an example of the multiple press-drawing steps performed by the press system 1. FIG. 3 is also a flowchart showing an example of the method of manufacturing a bottomed container according to the present embodiment, which will be described later. The flowchart shown in FIG. 3 is an example of a configuration in which the press system 1 performs two press-drawing steps as the multiple press-drawing steps. As shown in the flowchart of FIG. 3, the press system 1 is configured to perform a first press-drawing step S1 and a second press-drawing step S2. In the example shown in FIG. 3, an initial press-drawing step, which is the first press-drawing, constitutes the first press-drawing step S1, and the second press-drawing step, which is the final press-drawing, constitutes the second press-drawing step S2. As shown in FIG. 3, when two press-drawing steps are performed as the multiple press-drawing steps in the press system 1, only two pairs of die 72 and punch 74 out of the eight pairs of die 72 and punch 74 are attached for use to the press system 1, and the other six pairs of die 72 and punch 74 are not mounted to the press system 1. In other words, when the press system 1 is to perform two press-drawing steps, the press system 1 has only two pairs of die 72 and punch 74 arranged in the workpiece transfer direction, and has two molds configured by the dies 72 and punches 74.

The press system 1 includes a first press unit that performs the first press-drawing step S1, and a second press unit that performs the second press-drawing step S2.

The first press unit is configured to perform the first press-drawing step S1, which is configured as at least one of the press-drawing steps excluding the final press-drawing step of the multiple press-drawing steps. As shown in the flowchart of FIG. 3, when two press-drawing steps are performed as the multiple press-drawing steps in the press system 1, the first press-drawing step S1 performed by the first press unit is configured as the press-drawing step that is performed first excluding the press-drawing step that is performed second, which is the final press-drawing step. Further, the first press-drawing step S1 performed by the first press unit is configured as the initial press-drawing step of the multiple press-drawing steps. In a case where two press-drawing steps are performed in the press system 1, the first press unit includes one mold of the two molds including the die 72 and the punch 74, which is located on the upstream side of the workpiece transfer direction. The first press unit includes the mold on the upstream side of the workpiece transfer direction configured by one pair of the die 72 and the punch 74, the die holder 70 and the bolster 58 that support the die 72, the ram 60 that supports the punch 74, and the servomotor and the camshaft 62 that function as a mechanism to cause the ram 60 to ascend and descend. Note that, the first press unit includes a first mold 71A (see FIG. 4) that includes a die 72A having a first shaping hole 73A as the long-hole-shaped shaping hole 73, as described below.

The second press unit is configured to perform the second press-drawing step S2, which is configured as the press-drawing step following the first press-drawing step S1 of the multiple press-drawing steps. As shown in the flowchart of FIG. 3, when two press-drawing steps are performed as the multiple press-drawing steps in the press system 1, the second press-drawing step S2 performed by the second press unit is configured as the final press-drawing step, which is the next press-drawing step following the first press-drawing step S1 serving as the initial press-drawing step. In a case where two press-drawing steps are performed in the press system 1, the second press unit includes one mold of the two molds including the die 72 and the punch 74, which is located on the downstream side of the workpiece transfer direction. The second press unit includes the mold on the downstream side of the workpiece transfer direction configured by one pair of the die 72 and the punch 74, the die holder 70 and the bolster 58 that support the die 72, the ram 60 that supports the punch 74, and the servomotor and the camshaft 62 that function as a mechanism to cause the ram 60 to ascend and descend. Note that, the second press unit includes a second mold 71B (see FIG. 5) that includes a die 72B having a second shaping hole 73B as the long-hole-shaped shaping hole 73, as will be described below.

2. Outline of Method of Manufacturing Bottomed Container

Next, the method of manufacturing a bottomed container according to an embodiment of the present invention will be described. The method of manufacturing a bottomed container according to the embodiment is a method of manufacturing a bottomed container in which a cylindrical box-section bottomed container is manufactured by molding a workpiece from a flat plate state to a box-section cylinder shape state having a bottom by performing multiple press-drawing steps by using multiple molds each having a long-hole-shaped shaping hole. The method of manufacturing a bottomed container according to the embodiment is performed, for example, by performing multiple press-drawing steps on the workpiece W using the press system 1. Therefore, the method of manufacturing a bottomed container according to this embodiment is a method of manufacturing a bottomed container of manufacturing a cylindrical box-section bottomed container by molding the workpiece W from a flat plate state to a box-section cylinder shape state by performing multiple press-drawing steps on the workpiece W using multiple molds each including the die 72 and the punch 74 and having the long-hole-shaped shaping hole 73.

The method of manufacturing a bottomed container according to the embodiment includes multiple press-drawing steps. As the multiple press-drawing steps, the method of manufacturing a bottomed container according to the embodiment may include two press-drawing steps, or may include three or more press-drawing steps. FIG. 3 is a flowchart showing an example of the method of manufacturing a bottomed container according to the embodiment. As exemplified in FIG. 3, in this embodiment, the method of manufacturing a bottomed container according to the embodiment includes multiple press-drawing steps and an ironing process performed after the multiple press-drawing steps. The method of manufacturing a bottomed container according to the exemplary embodiment shown in FIG. 3 includes the first press-drawing step S1 and the second press-drawing step S2. The method of manufacturing a bottomed container shown in FIG. 3 includes two press-drawing steps, in which the first press-drawing step, which is the initial press-drawing, constitutes the first press-drawing step S1, and the second press-drawing step, which is the final press-drawing, constitutes the second press-drawing step S2.

As shown in FIG. 3, after the first press-drawing step S1 and the second press-drawing step S2 are complete, an ironing process S3 may be performed. The ironing process S3 is performed on the cylindrical box-section bottomed container that has been formed and manufactured by performing the multiple press-drawing steps, after the multiple press-drawing steps are complete. In the ironing process S3, an ironing die is used to iron the wall of the manufactured cylindrical box-section bottomed container, reducing the thickness of the wall and defining the final shape of the product. If the ironing process S3 is not carried out after the multiple press-drawing steps, the shape of the bottomed container produced after the multiple press-drawing steps will define the final shape of the product.

The first press-drawing step S1 is composed of at least one of the press-drawing steps of the multiple press-drawing steps, excluding the final press-drawing step. The method of manufacturing a bottomed container shown in FIG. 3 is configured as a method of manufacturing a bottomed container including two press-drawing steps. Thus, the first press-drawing step S1 is configured as the press-drawing step that is performed first, excluding the press-drawing step that is performed second, which is the final process. In the method of manufacturing a bottomed container as shown in FIG. 3, the first press-drawing step S1 is configured as the initial press-drawing step of the multiple press-drawing steps.

The second press-drawing step S2 is configured as the press-drawing step of the multiple press-drawing steps following the first press-drawing step S1. The method of manufacturing a bottomed container shown in FIG. 3 is configured as a method of manufacturing a bottomed container including two press-drawing steps. Thus, the second press-drawing step S2 is configured as the final press-drawing step, which is the press-drawing step following the first press-drawing step S1 serving as the initial press-drawing step. The method of manufacturing a bottomed container according to this embodiment is completed by performing the first press-drawing step S1 and the second press-drawing step S2. As shown in FIG. 3, after the multiple press-drawing steps are complete, the ironing process S3 may be performed to reduce the thickness of the wall of the bottomed container.

Figure 5:
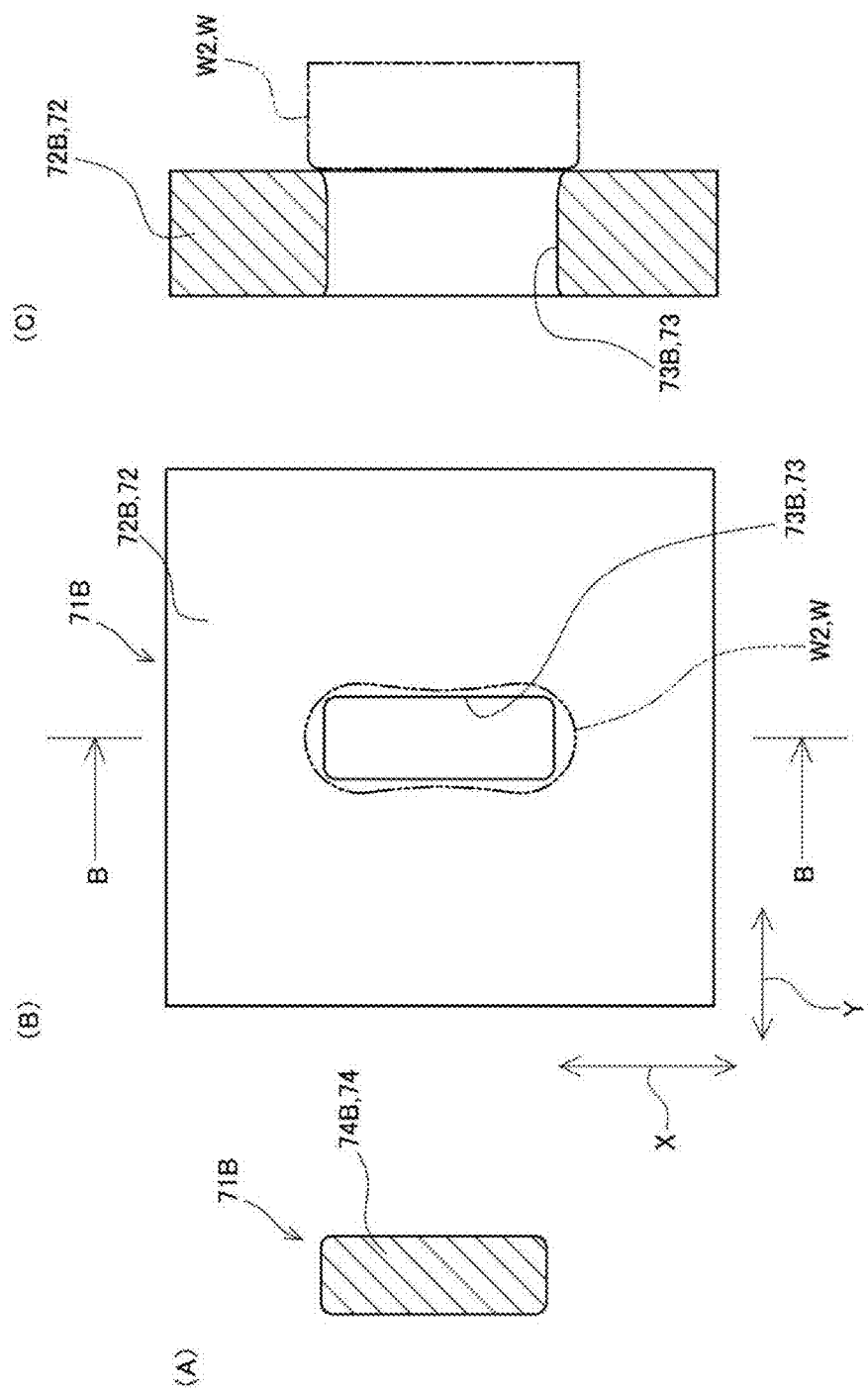
Figure 6:
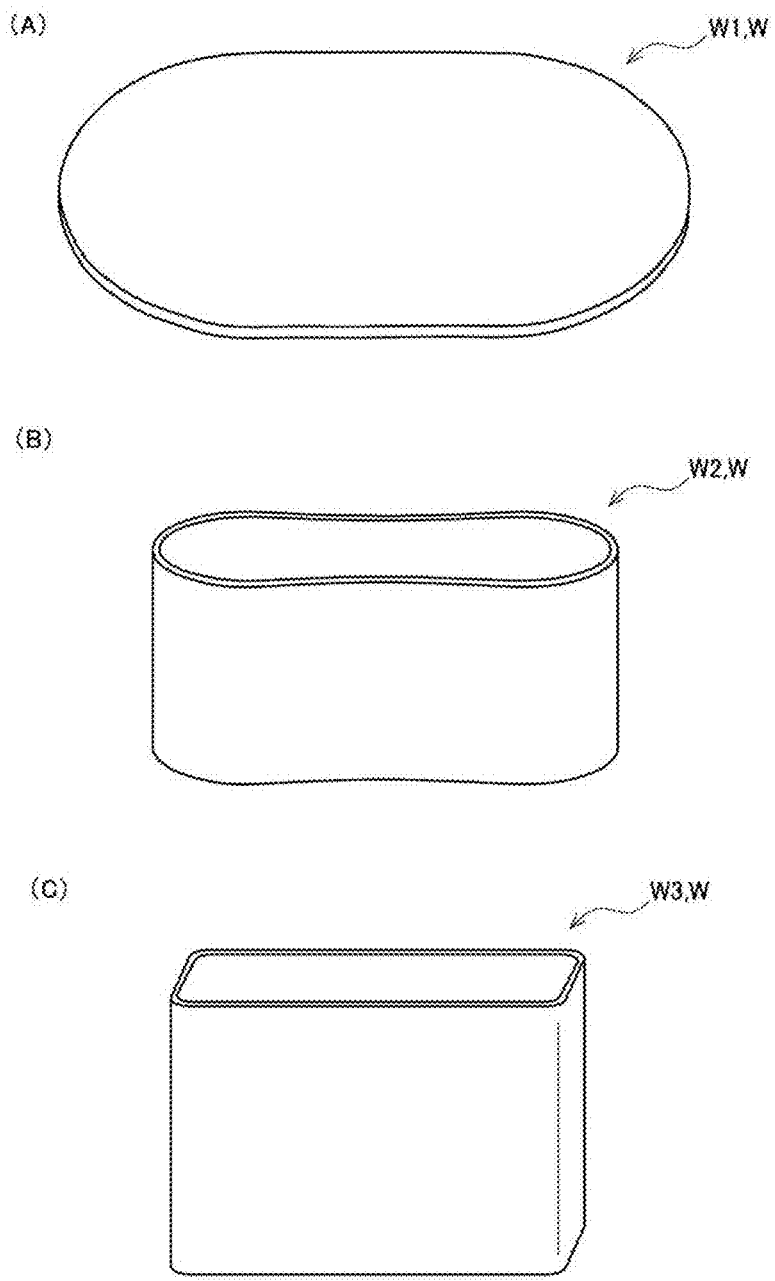
FIG. 6 is a view for explaining a workpiece subjected to a press-drawing step in a method of manufacturing a bottomed container and the press system.

3. Characteristic Configurations of First and Second Press-Drawing Steps and First and Second Press Units Next, characteristic configurations of the first and second press-drawing steps in the method of manufacturing a bottomed container according to the embodiment, and the first and second press units according to the embodiment will be described. FIG. 4 is a view showing an example of the first mold 71A used in the first press-drawing step S1 in the method of manufacturing a bottomed container shown in FIG. 3, and also shows an example of the first mold 71A of the first press unit in the press system 1, in which FIG. 4(A) is a cross-sectional plan view showing the punch 74A in the first mold 71A; FIG. 4(B) is a plan view of a die 72A in the first mold 71A; and FIG. 4(C) is a cross-sectional view taken along the arrow A-A in FIG. 4(B). FIG. 5 is a view showing an example of a second mold 71B used in the second press-drawing step S2 in the method of manufacturing a bottomed container shown in FIG. 3, and shows an example of the second mold 71B of the second press unit in the press system 1, in which: FIG. 5(A) is a cross-sectional plan view showing a punch 74B in the second mold 71B; FIG. 5(B) is a plan view of a die 72B in the second mold 71B; and FIG. 5(C) is a cross-sectional view taken along the arrow B-B in FIG. 5(B). FIG. 6 is a view for explaining the workpiece W subjected to the method of manufacturing a bottomed container and the press-drawing step in the press system 1 according to the embodiment.

Figure 4:
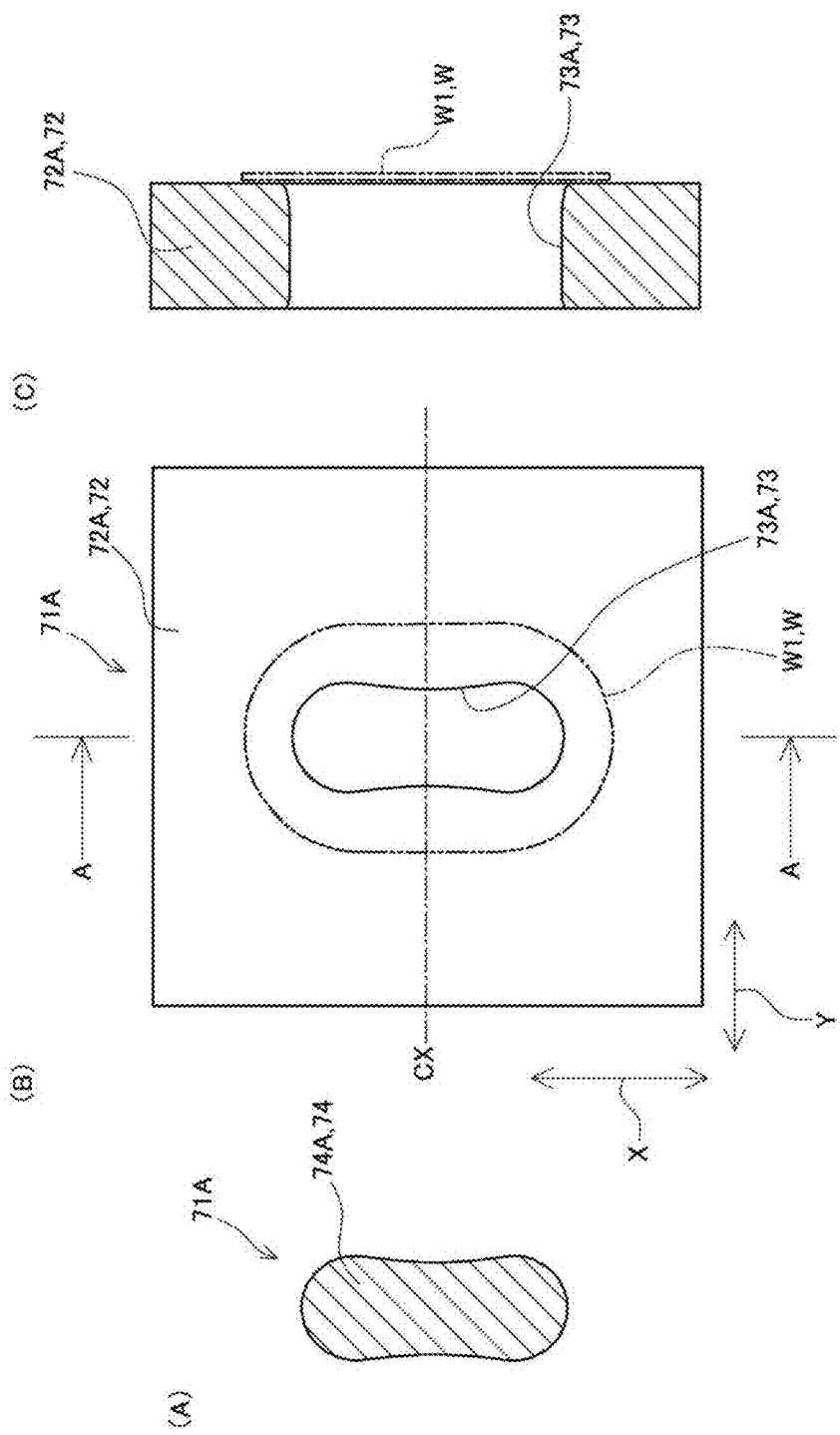

Referring to FIG. 4, the first mold 71A of the first press unit of the press system 1, which is used in the first press-drawing step S1 in the method of manufacturing a bottomed container according to this embodiment, includes the die 72A and the punch 74A. The die 72A is provided as one of the multiple dies 72 that are mounted to the press system 1. The die 72A is configured as the die 72 of the first mold 71A of the first press unit in the press system 1, and is also configured as the die 72 used in the first press-drawing step S1 in the method of manufacturing a bottomed container according to this embodiment. The punch 74A is provided as one of the multiple punches 74 that are mounted to the press system 1. The punch 74A is provided as the punch 74 of the first mold 71A of the first press unit in the press system 1, and is also provided as the punch 74 used in the first press-drawing step S1 in the method of manufacturing a bottomed container according to this embodiment.

Referring to FIGS. 4(B) and 4(C), the die 72A has the first shaping hole 73A as the long-hole-shaped shaping hole 73 of the die 72. In other words, the die 72A has the first shaping hole 73A formed as the long-hole-shaped shaping hole 73 in a plan view as viewed in the up-down direction. The first shaping hole 73A is formed extending through the die 72A in the up-down direction and has a long-hole-shaped cross-sectional shape. The first shaping hole 73A is formed such that its dimension in a longitudinal direction X, which is the direction in which the first shaping hole 73A extends in a long hole shape, is larger than its dimension in a width direction Y, which is a direction perpendicular to the longitudinal direction X. In FIG. 4(B), the longitudinal direction X is indicated by the double-ended arrow X, and the width direction Y is indicated by the double-ended arrow Y.

For example, the first shaping hole 73A is formed to have a semicircular shape at each end in the longitudinal direction X. The first shaping hole 73A is formed such that the shape of a part of the first shaping hole 73A in the circumferential direction, excluding both ends in the longitudinal direction X, tapers inward in the width direction Y from both end sides to the center side in the longitudinal direction X. In other words, the first shaping hole 73A is formed such that the shape of the part in the circumferential direction, excluding the both ends in the longitudinal direction X, gradually becomes narrower in the width direction Y from the both ends to the center in the longitudinal direction X. Further, the first shaping hole 73A is formed such that the first shaping hole 73A tapers inward in the width direction Y from the two ends to the center in the longitudinal direction X over the entire length in the up-down direction, which is the direction in which the first shaping hole 73A extends through the die 72A. In addition, the first shaping hole 73A is formed such that the first shaping hole 73A narrows while smoothly curving in an arc inward in the width direction Y from the two ends to the center in the longitudinal direction X, and is most narrow at a center position CX in the longitudinal direction X. In FIG. 4(B), the center position CX in the longitudinal direction X of the first shaping hole 73A of the die 72A is indicated by the dotted line CX.

Referring to FIG. 4(A), the punch 74A is formed in a shape corresponding to the first shaping hole 73A of the die 72A. In other words, the outer circumference shape of the punch 74A is formed to match the shape corresponding to the first shaping hole 73A of the die 72A. Thus, the punch 74A is formed such that both ends of the punch 74A in a direction parallel to the longitudinal direction X of the first shaping hole 73A each have a semicircular cross-sectional shape. The shape of a portion of the punch 74A excluding the two ends having the semicircular cross-sectional shape in the circumferential direction, is formed smoothly curved and recessed inward in a circular arc in the direction parallel to the width direction Y of the first shaping hole 73A from the two ends to the center in the direction parallel to the longitudinal direction X of the first shaping hole 73A.

The first press unit of the press system 1 includes the first mold 71A that includes the die 72A having the first shaping hole 73A serving as the long hole-shaped shaping hole 73, and the first press-drawing step S1 is performed using the first mold 71A. In addition, the first press-drawing step S1 in the method of manufacturing a bottomed container according to this embodiment is performed using the first mold 71A, which includes the die 72A having the first shaping hole 73A as the long-hole-shaped shaping hole 73. The first press-drawing step S1 is performed by using the die 72A formed with the first shaping hole 73A having a long hole shape and having a shape that smoothly tapers inward in the width direction Y toward the center in the longitudinal direction X, and by using the punch 74A having a cross-sectional shape corresponding to the first shaping hole 73A. In the first press-drawing step S1, press-drawing using the die 72A and the punch 74A is performed on a workpiece W1, which is the workpiece W in flat plate state supplied from the workpiece supply device 10 of the press system 1. In FIG. 6(A), the workpiece W1 in the form of a workpiece W in flat plate state is shown in a perspective view, and in FIGS. 4(B) and 4(C), the workpiece W1 is indicated by a double dotted line.

In the first press-drawing step S1 of the method of manufacturing a bottomed container according to this embodiment and the first press-drawing step S1 performed by the first press unit of the press system 1, the punch 74A pushes the workpiece W1 into the first shaping hole 73A of the die 72A such that the workpiece W1 is formed into a workpiece W2 serving as the workpiece W having a cylindrical bottomed shape. FIG. 6(B) shows the workpiece W2, which is the workpiece W formed after performing the first press-drawing step S1, in a perspective view. The workpiece W2 has a bottom and is formed in a cylindrical shape with a cross-sectional shape corresponding to the shape of the first shaping hole 73A. In FIG. 6(B), an upper end portion of the workpiece W2 is shown schematically in a flat state.

Referring to FIG. 5, the second mold 71B of the second press unit in the press system 1, which is used in the second press-drawing step S2 in the method of manufacturing a bottomed container according to this embodiment, includes the die 72B and the punch 74B. The die 72B is provided as one of the multiple dies 72 that are mounted to the press system 1. The die 72B is configured as the die 72 of the second mold 71B of the second press unit in the press system 1, and is also configured as the die 72 used in the second press-drawing step S2 in the method of manufacturing a bottomed container according to this embodiment. The punch 74B is provided as one of the multiple punches 74 that are mounted to the press system 1. The punch 74B is provided as the punch 74 of the second mold 71B of the second press unit in the press system 1, and is also provided as the punch 74 used in the second press-drawing step S2 in the method of manufacturing a bottomed container according to this embodiment.

Referring to FIGS. 5(B) and 5(C), the die 72B includes the second shaping hole 73B as the long-hole-shaped shaping hole 73 of the die 72. In other words, the die 72B includes the second shaping hole 73B, which is formed as a long hole-shaped shaping hole 73 when viewed in a plan view in the up-down direction. The second shaping hole 73B is formed extending through the die 72B in the up-down direction with a long hole-shaped cross-sectional shape. The second shaping hole 73B is formed so that its dimension in the longitudinal direction X, which is the direction in which the second shaping hole 73B extends in the long hole shape, is larger than its dimension in the width direction Y, which is the direction perpendicular to the longitudinal direction X. In FIG. 5(B), the longitudinal direction X is indicated by the double-ended arrow X, and the width direction Y is indicated by the double-ended arrow Y.

The second shaping hole 73B is formed in the shape of an elongated roughly rectangle shape extending in the longitudinal direction X. More specifically, the second shaping hole 73B is formed in the shape of a rectangle, with the corners of the rectangle each formed in the shape of an arc. In this embodiment, the second press-drawing step S2 constitutes the final press-drawing step. Therefore, the shape of the second shaping hole 73B corresponds to the cross-sectional shape of the box-section bottomed cylindrical container that will ultimately be manufactured after undergoing the multiple press-drawing steps in the method of manufacturing a bottomed container of this embodiment.

Referring to FIG. 5(A), the punch 74B is formed in a shape corresponding to the die 72B. In other words, the outer peripheral shape of the punch 74B is formed in a shape corresponding to the second shaping hole 73B of the die 72B. Thus, the punch 74B is formed with a roughly rectangular cross-sectional shape that is long in a direction parallel to the longitudinal direction X of the second shaping hole 73B.

The second press unit of the press system 1 includes the second mold 71B that includes the die 72B having the second shaping hole 73B as the long-hole-shaped shaping hole 73, and the second press-drawing step S2 is performed using the second mold 71B. Further, the second press-drawing step S2 in the method of manufacturing a bottomed container according to this embodiment is performed using the second mold 71B that includes the die 72B having the second shaping hole 73B as the long-hole-shaped shaping hole 73 having a substantially rectangular shape. The second press-drawing step S2 is performed using the die 72B including the long-hole-shaped shaping hole 73B having a substantially rectangular shape, and the punch 74B having a cross-sectional shape corresponding to the second shaping hole 73B. In the second press-drawing step S2, the cylindrical workpiece W2 formed by the first press-drawing step S1 is subjected to press-drawing using the die 72B and the punch 74B. In FIGS. 5(B) and 5(C), the workpiece W2 is indicated by the double dotted line.

In the second press-drawing step S2 in the method of manufacturing a bottomed container of this embodiment and the second press-drawing step S2 performed by the second press unit of the press system 1, the punch 74B pushes the workpiece W2 into the second shaping hole 73B of the die 72B such that the workpiece W2 is formed into a workpiece W3, which is the workpiece W as a box-section bottomed cylindrical container with a bottom. By performing the second press-drawing step S2, a box-section bottomed cylindrical container formed as the cylindrical workpiece W3 is manufactured. In FIG. 6(C), the box-section bottomed cylindrical container formed and manufactured as the workpiece W3 by the second press-drawing step S2 is shown in a perspective view. In FIG. 6(C), an upper end portion of the workpiece W3 is shown schematically in a flat state. In this embodiment, the second press-drawing step S2 constitutes the final press-drawing step. Therefore, the workpiece W3 formed by performing the second press-drawing step S2 is formed in the shape of a bottomed container that is manufactured by the multiple press-drawing steps in the method of manufacturing a bottomed container according to this embodiment, and constitutes a box-section bottomed cylindrical container with a bottom that is manufactured by the method of manufacturing a bottomed container with a bottom according to this embodiment. In the following description, the box-section bottomed cylindrical container formed and manufactured as the workpiece W3 by the second press-drawing step S2 is also referred to as "bottomed container W3".

Figure 7:
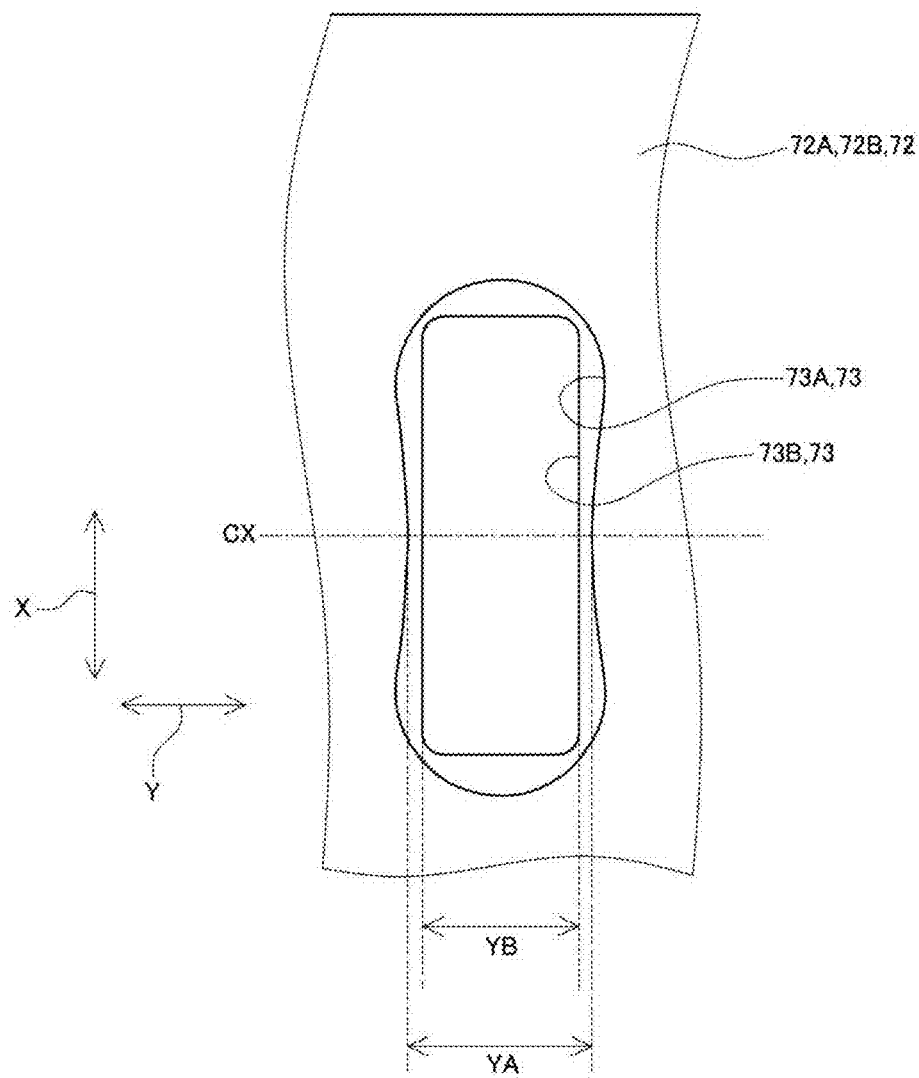
FIG. 7 is a view schematically showing a comparison of shaping holes of dies used in the first press-drawing step and the second press-drawing step in the method of manufacturing a bottomed container, and also schematically shows a comparison of shaping holes of dies used in the first press-drawing step and the second press-drawing step performed by the first press unit and the second press unit in the press system, respectively.

Here, the relationship between the shapes of the shaping holes 73 of the dies 72 in the first press-drawing step S1 and the second press-drawing step S2 will be further described. The following explanation of the relationship between the shapes of the shaping holes 73 of the dies 72 is an explanation of the relationship between the shapes of the shaping holes 73 of the dies 72 in the first press-drawing step S1 and the second press-drawing step S2 in the method of manufacturing a bottomed container according to this embodiment, and is also an explanation of the relationship between the shapes of the shaping holes 73 of the dies 72 in the first press unit that performs the first press-drawing step S1 and the second press unit that performs the second press-drawing step S2 in the press system 1. FIG. 7 is a view schematically showing a comparison of the shaping holes 73 of the dies 72 used in the first press-drawing step S1 and the second press-drawing step S2 in the method of manufacturing a bottomed container according to the embodiment, and schematically shows a comparison of the shaping holes 73 of the dies 72 used in the first press-drawing step S1 and the second press-drawing step S2 performed by the first press unit and the second press unit in the press system 1, respectively. In other words, FIG. 7 schematically shows a comparison of the first shaping hole 73A of the die 72A used in the first press-drawing step S1 and the second shaping hole 73B of the die 72B used in the second press-drawing step S2, and schematically shows a comparison of the first shaping hole 73A of the die 72A of the first press unit and the second shaping hole 73B of the die 72B of the second press unit in the press system 1. Of course, the die 72A and the die 72B are not one die 72 but two separate and different dies 72. However, in FIG. 7, the die 72A and the die 72B are shown schematically superimposed for the purpose of comparing the first shaping hole 73A and the second shaping hole 73B.

Referring to FIG. 7, the area of the first shaping hole 73A is larger than the area of the second shaping hole 73B along the entire circumference of the area. In other words, in a state where the die 72A and the die 72B are superimposed, the outline of the first shaping hole 73A and the outline of the second shaping hole 73B do not overlap in a plan view, and the second shaping hole 73B is arranged inside the first shaping hole 73A. Thus, the first shaping hole 73A is formed with a larger dimension in the width direction Y perpendicular to the longitudinal direction X than the second shaping hole 73B over the entire length of the longitudinal direction X, which is the direction in which the second shaping hole 73B extends in the shape of a long hole. Furthermore, the first shaping hole 73A is formed with a larger dimension in the width direction Y than the second shaping hole 73B over the entire length in the up-down direction, which is the direction in which the first shaping hole 73A extends through the die 72A. More specifically, first, the second shaping hole 73B has a substantially rectangular shape, and a width dimension YB, which is the dimension of the second shaping hole 73B in the width direction Y, is set to a certain dimension. The width dimension YB of the second shaping hole 73B is set to a constant dimension over the entire length in the up-down direction, which is the direction in which the second shaping hole 73B extends through the die 72B. On the other hand, the first shaping hole 73A is formed to a size where a semicircular portion of the first shaping hole 73A in the longitudinal direction X surrounds both ends of the second shaping hole 73B in the longitudinal direction X over the entire length in the up-down direction. Furthermore, the first shaping hole 73A is formed such that, at a portion excluding both ends in the longitudinal direction X in the circumferential direction, the dimension of the first shaping hole 73A in the width direction Y gradually decreases from both end sides to the center side in the longitudinal direction X over the entire length in the up-down direction, and becomes a width dimension YA, which is the smallest dimension, at the center position CX in the longitudinal direction X. The width dimension YA, which is the portion of the first shaping hole 73A other than the two ends in the longitudinal direction X that has the smallest dimension in the width direction Y, is formed to be larger than the width dimension YB of the second shaping hole 73B. As a result, the first shaping hole 73A is formed with a larger dimension in the width direction Y perpendicular to the longitudinal direction X, which is the direction in which the first shaping hole 73A extends in the shape of a long hole, than the second shaping hole 73B along the entire length in the up-down direction.

(Action of First Press-Drawing Step and First Press Unit)

Figure 8:
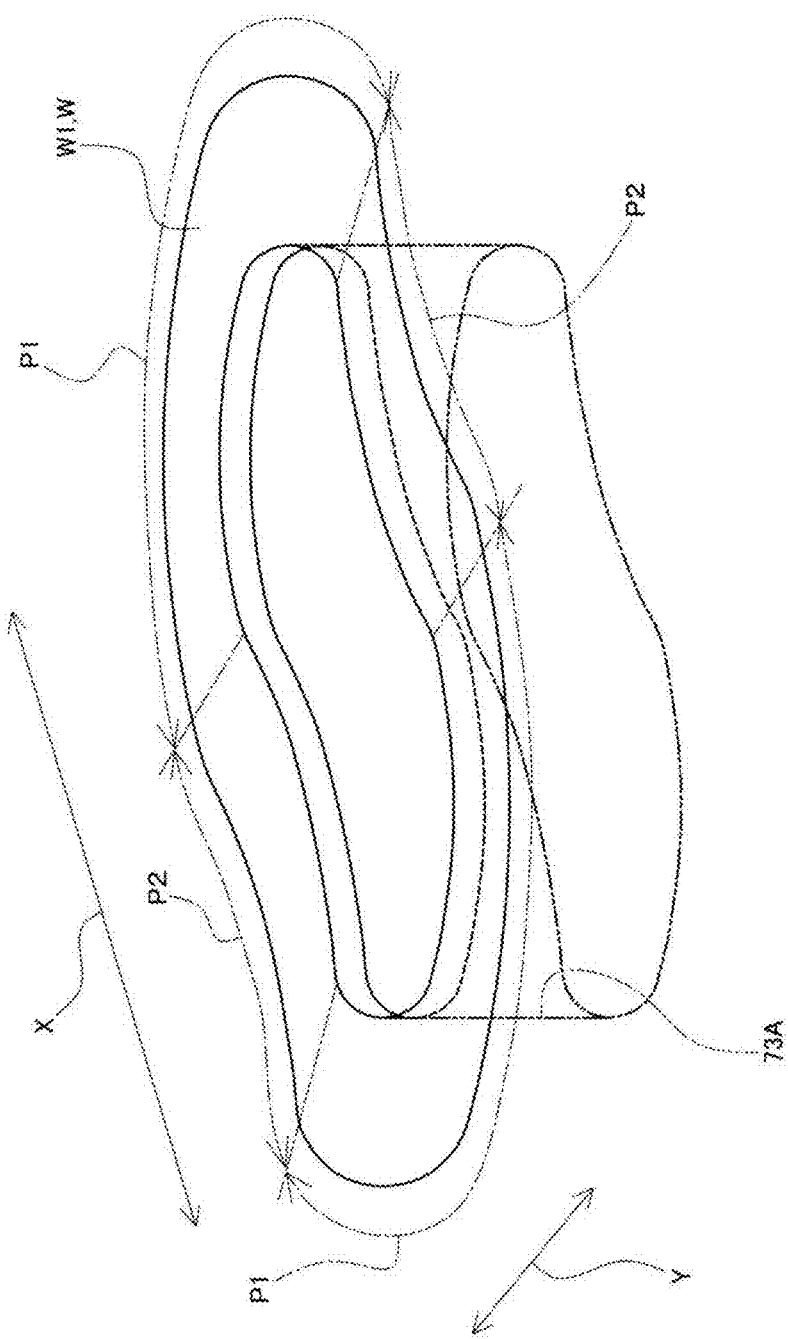
FIG. 8 is a view for explaining force acting on the workpiece in the first press-drawing step in the method of manufacturing a bottomed container, and explains the force that acts on the workpiece in the first press-drawing step performed by the first press unit in the press system.

Next, the action of the first press-drawing step S1 in the method of manufacturing a bottomed container according to this embodiment and the action of the first press unit that performs the first press-drawing step S1 in the pressing system 1 will be described. The following description of actions is a description of the action of the first press-drawing step S1 in the method of manufacturing of a bottomed container according to this embodiment, and also serves as a description of the action of the first press unit that performs the first press-drawing step S1 in the press system 1. FIG. 8 is a view for explaining force acting on the workpiece W in the first press-drawing step S1 in the method of manufacturing a bottomed container according to this embodiment, and also explaining the force that acts on the workpiece W in the first press-drawing step S1 performed by the first press unit in the press system 1. Note that, FIG. 8 schematically shows the workpiece W1 as the workpiece W in an intermediate state of being subjected to press-drawing by the die 72A and the punch 74A in the first press-drawing step S1 in the method of manufacturing a bottomed container according to this embodiment, and schematically shows the workpiece W1 as the workpiece W in an intermediate state of being subjected to press-drawing by the die 72A and the punch 74A of the first press unit in the press system 1. In addition, in FIG. 8, the die 72A and the punch 74A are omitted from the drawing, and the first shaping hole 73A is schematically illustrated with a double dotted line.

Referring to FIG. 8, when the first press-drawing step S1 starts, the workpiece W1 placed on the die 72A is pushed into the first shaping hole 73A by the punch 74A. When the workpiece W1 is pushed into the first shaping hole 73A, a compressive force is generated in the circumferential direction of the first shaping hole 73A at portions of the workpiece W1 that are processed in the semicircular arc-shaped region at both ends of the first shaping hole 73A in the longitudinal direction X. In FIG. 8 and FIG. 10(A) to be described below, the portions of the workpiece W1 that are processed at both end sides of the first shaping hole 73A in the longitudinal direction X are indicated by the dotted line double-ended arrow P1, and these portions are also referred to below as "end processed portions P1". The end processed portions P1 of the workpiece W1 are in a state of shrinkage flange forming, so a compressive force is generated in the circumferential direction.

On the other hand, when the workpiece W1 is pushed into the first shaping hole 73A, a tensile force is generated in the circumferential direction of the first shaping hole 73A at the portion of the workpiece W1 that is processed in a central region excluding the both ends of the first shaping hole 73A in the longitudinal direction X. In FIG. 8 and FIG. 10(A) to be described below, the portion of the workpiece W1 that is processed in the central region excluding the both ends of the first shaping hole 73A in the longitudinal direction X is indicated by the dotted line double-ended arrow P2, and this part is referred to below as a "center processed portion P2". The center processed portion P2 of the workpiece W1 is subjected to stretch flange forming, so a tensile force is applied in the circumferential direction.

As described above, in the first press-drawing step S1, in the workpiece W1, a compressive force is generated in the circumferential direction at the end processed portions P1, and a tensile force is generated in the circumferential direction at the center processed portion P2. Therefore, in the workpiece W1, the circumferential tensile force generated at the center processed portion P2 opposes the circumferential compressive force generated at the end processed portions P1. In the workpiece W1, plastic flow occurs smoothly from the end processed parts P1 where the compressive force is generated toward the center processed part P2 where the tensile force is generated, and the workpiece W1 is pressed between the die 72A and the punch 74A such that the workpiece W1 is formed into the shape of the workpiece W2. In the first press-drawing step S1, since plastic flow occurs smoothly from the end processed parts P1 where the compressive force is generated toward the center processed part P2 where the tensile force is generated, the volume of the material at the center processed part P2 is suppressed, and plastic flow is suppressed to the bottom side of the portion that is being formed into the shape of the workpiece W2. This suppresses warping at the bottom of the workpiece W2 at the center in the longitudinal direction X when the workpiece W1 is formed into the workpiece W2 by the first press-drawing step S1.

Figure 9:
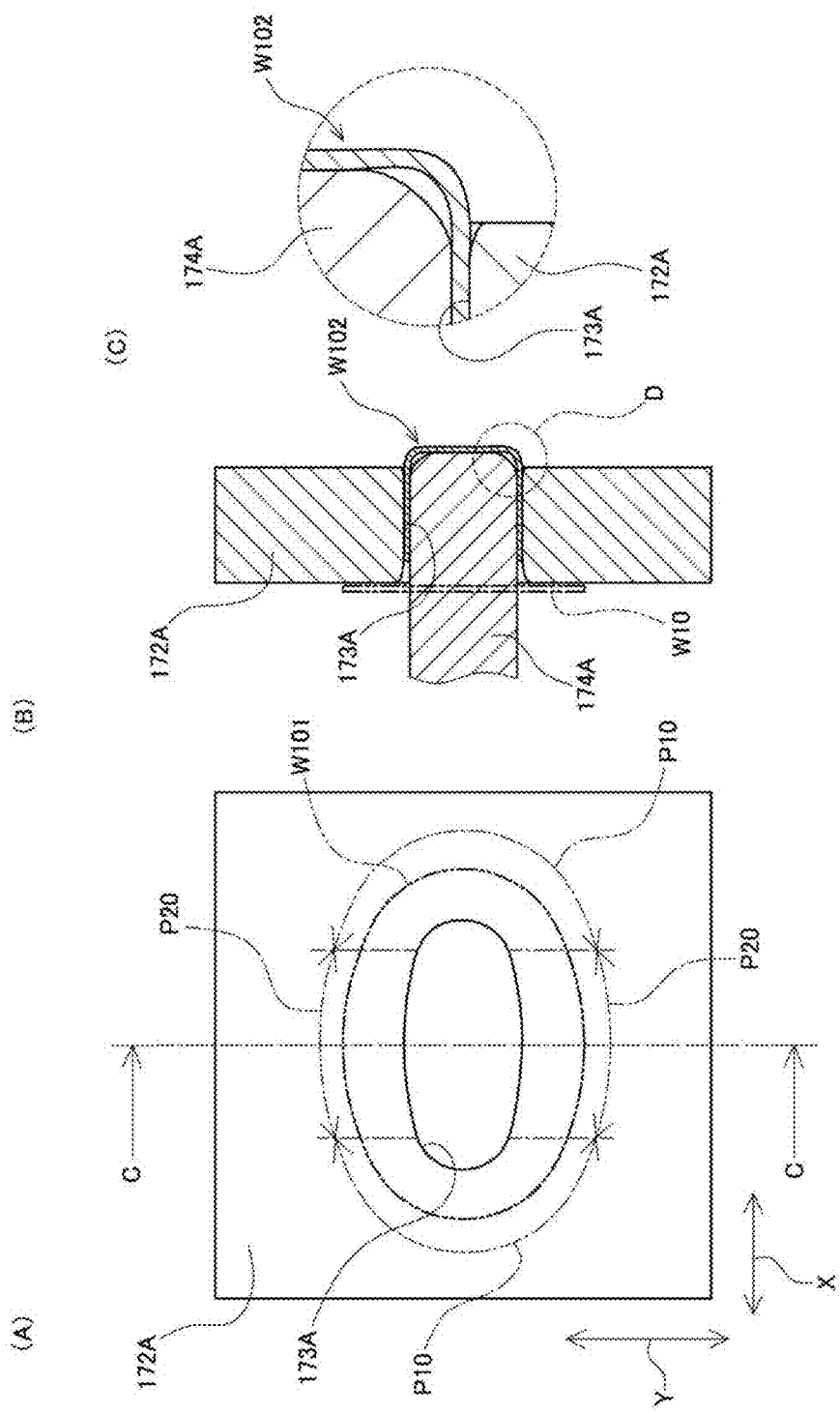

Now, the effect of suppressing warping of the bottom of the workpiece W2 formed by the first press-drawing step S1 will be described in more detail, in comparison with a conventional press-drawing step. FIG. 9 is a view for explaining a conventional press-drawing step, in which: FIG. 9(A) is a plan view of a die 172A; FIG. 9(B) is a cross-sectional view showing a state where a workpiece W101 is subject to a drawing process to form a workpiece W102; and FIG. 9(C) is an enlarged view of the portion D surrounded by the dashed line in FIG. 9(B). The conventional press-drawing step explained with reference to FIG. 9 configures the initial press-drawing step in a conventional method of manufacturing a bottomed container, in which a box-section bottomed cylindrical container is formed from the workpiece in flat plate state W101 by performing multiple press-drawing steps.

Referring to FIG. 9, the conventional press-drawing step is performed using the die 172A formed with a long-hole-shaped shaping hole 173A, and a punch 174A corresponding to the die 172A. The shaping hole 173A of the die 172A is formed such that its dimension in the longitudinal direction X, which is the direction in which the shaping hole 173A extends in a long hole shape, is larger than its dimension in the width direction Y, which is the direction perpendicular to the longitudinal direction X. In FIG. 9(A), the longitudinal direction X is indicated by the double-ended arrow X, and the width Y direction is indicated by the double-ended arrow Y. In addition, the shaping hole 173A of the die 172A is formed in a shape that expands outward in an elliptical shape over the entire circumference. The punch 174A is formed to correspond to the shape of the shaping hole 173A of the die 172A. In other words, the outer circumference of the punch 174A is formed to correspond to the shape of the shaping hole of the die 172A, i.e., to expand outward in an elliptical shape over the entire circumference.

In the conventional press-drawing step, press-drawing is performed using the die 172A and the punch 174A on the workpiece W101, which is in the state of a flat plate. In FIGS. 9(A) and 9(B), the workpiece W101 is indicated by the double dotted line. In the conventional press-drawing step, the punch 174A pushes the workpiece W101 into the shaping hole 173A of the die 172A such that the workpiece W101 is formed into the cylindrical workpiece W102 having a bottom (see FIG. 9(B)). When the workpiece W101 is pushed into the shaping hole 173A, a circumferential compressive force is generated in the workpiece W101 over the entire circumference. In other words, in the conventional press-drawing step, since the workpiece W101 is formed by the shaping hole 173A, which expands outward in an elliptical shape over the entire circumference, a compressive force is generated in the workpiece W101 not only in the portions processed at both ends of the shaping hole 173A in the longitudinal direction X but also in the portion processed in the central region of the shaping hole 173A in the longitudinal direction X. In FIG. 9(A), the portions of the workpiece W101 that are processed at both end sides of the shaping hole 173A in the longitudinal direction X are indicated by the dotted line double-ended arrow P10, and these parts are also referred to below as "end processed portions P10". The portion of the workpiece W101 that is processed in the central region of the first shaping hole 73A is indicated by the dotted line double-ended arrow P20, and this part is referred to below as a "center processed portion P20".

In the conventional press-drawing step, in the workpiece W101, circumferential compressive force is generated over the entire circumference of the shaping hole 173A, and circumferential compressive force is generated at both the end processed portions P10 and the center processed portion P20. However, because the curvature of the ends of the long hole-shaped shaping hole 173A that expands in an elliptical shape along the entire circumference is greater than the curvature of the center part in the longitudinal direction X, the amount of processing of the end processing portions P10 is greater than the amount of processing of the center processing portion P20. As a result, plastic flow occurs from the end processed portions P10 to the center processed portion P20, and the volume of material at the center processed portion P20 becomes excessive. Thus, the material at the center processed portion P20, which has an excessive volume, flows plastically to the bottom side of the workpiece W102, which is not constrained by the die 172A and the punch 174A. As a result, as shown in FIGS. 9(B) and 9(C), in the conventional press-drawing step, it is easy for part of a central portion of the bottom of the workpiece W102 in the longitudinal direction X that has been subjected to press-drawing to bulge away from the punch 174A, and it is easy for warping to occur at the bottom of the workpiece W102 at the center in the longitudinal direction X.

Figure 10:
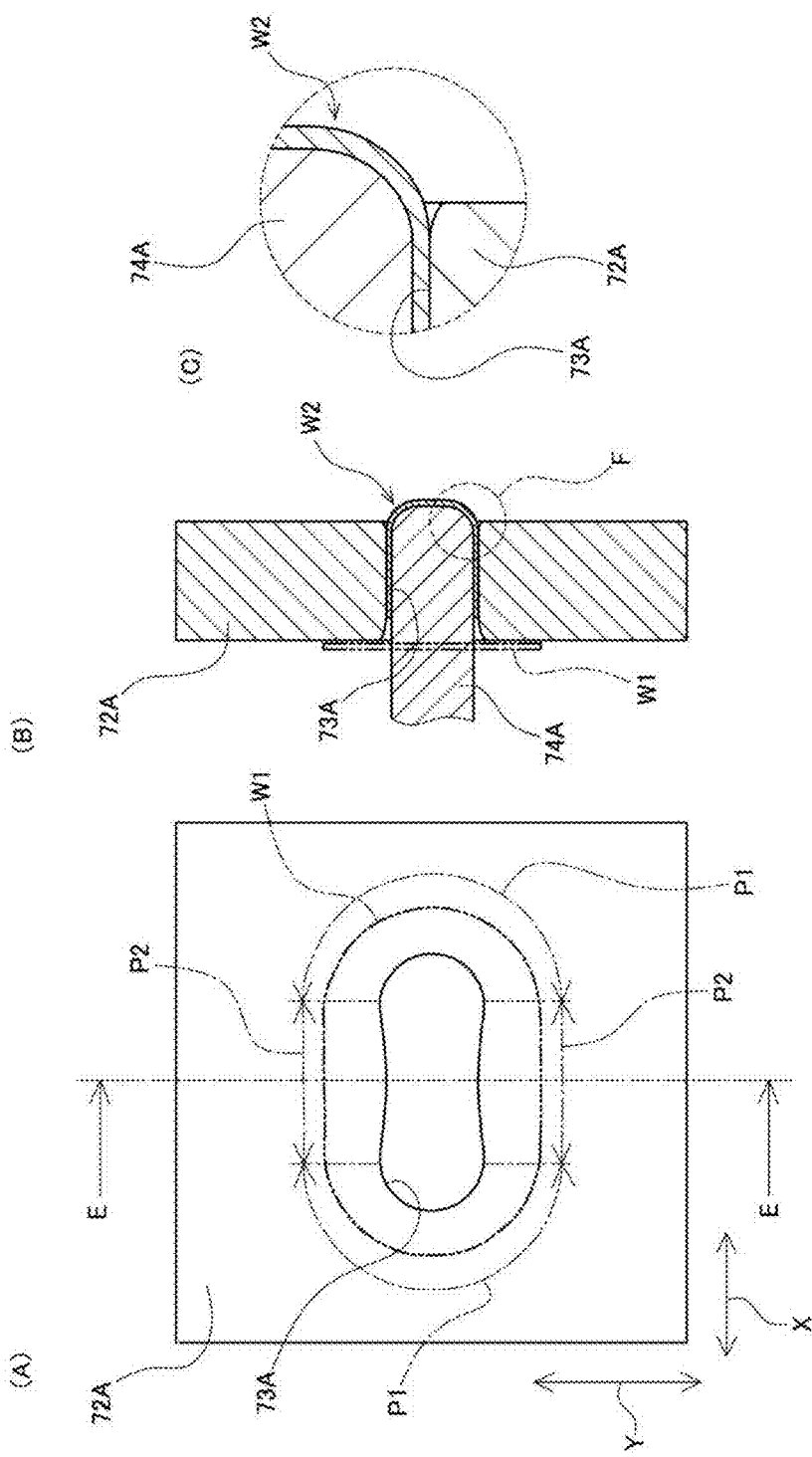

On the other hand, in the first press-drawing step S1 in the method of manufacturing a bottomed container according to this embodiment and the first press-drawing step S1 performed by the first press unit of the press system 1, warping of the bottom of the workpiece W2 formed by the first press-drawing step S1 is suppressed. FIG. 10 is a view for explaining the first press-drawing step S1 in the method of manufacturing a bottomed container according to this embodiment and the first press-drawing step S1 performed by the first press unit in the press system 1, in which: FIG. 10(A) is a plan view of the die 72A; FIG. 10(B) is a cross-sectional view showing a state where the workpiece W1 is subject to a drawing process to form the workpiece W2; and FIG. 10(C) is an enlarged view of the portion F surrounded by the dashed line in (B).

Referring to FIG. 10, the first press-drawing step S1 is performed using the die 72A including the first shaping hole 73A formed in a shape that tapers inward in the width direction Y from both end sides to the center side in the longitudinal direction X, and the punch 74A corresponding to the die 72A. In the first press-drawing step S1, the workpiece W1 in the state of a flat plate is subjected to press-drawing using the die 72A and the punch 74A. The punch 74A pushes the workpiece W1 into the first shaping hole 73A of the die 72A such that the workpiece W1 is formed into the cylindrical workpiece W2 with a bottom (see FIG. 10(B)). When the workpiece W1 is pushed into the first shaping hole 73A, a compressive force is generated in the circumferential direction of the first shaping hole 73A at the end processed portions P1 of the workpiece W1. On the other hand, when the workpiece W1 is pushed into the first shaping hole 73A, a tensile force is generated at the center processed portion P2 of the workpiece W1 in the circumferential direction of the first shaping hole 73A.

In the first press-drawing step S1, in the workpiece W1, a compressive force is generated in the circumferential direction at the end processed portions P1, and a tensile force is generated in the circumferential direction at the center processed portion P2. Therefore, in the workpiece W1, the circumferential tensile force generated at the center processed portion P2 opposes the circumferential compressive force generated at the end processed portions P1. Further, in the workpiece W1, plastic flow occurs smoothly from the end processed portions P1 where the compressive force is generated to the center processed portion P2 where the tensile force is generated, and the workpiece W1 is pressed between the die 72A and the punch 74A such that the workpiece W1 is formed into the shape of the workpiece W2. In other words, the material that has undergone plastic flow from the end processed portions P1 where the compressive force is generated to the center processed portion P2 where the tensile force is generated is used to form the center processed portion P2 without the volume becoming excessive at the center processed portion P2. In this way, in the first press-drawing step S1, since plastic flow occurs smoothly from the end processed portions P1 where the compressive force is generated to the center processed portion P2 where the tensile force is generated, the volume of the material at the center processed portion P2 is suppressed from being excessive, and plastic flow to the bottom side of the portion to be formed into the shape of the workpiece W2 is suppressed. As a result, as shown in FIGS. 10(B) and 10(C), in the first press-drawing step S1, the center portion in the longitudinal direction X of the bottom of the workpiece W2 that has undergone press-drawing is unlikely to separate from the punch 74A, and the shape of the portion is approximately the same as the shape of the punch 74A or is a shape that is considerably close to the shape of the punch 74A. As a result, in the first press-drawing step S1, warping of the bottom side of the workpiece W2 at the center portion in the longitudinal direction X is suppressed.

Figure 11:
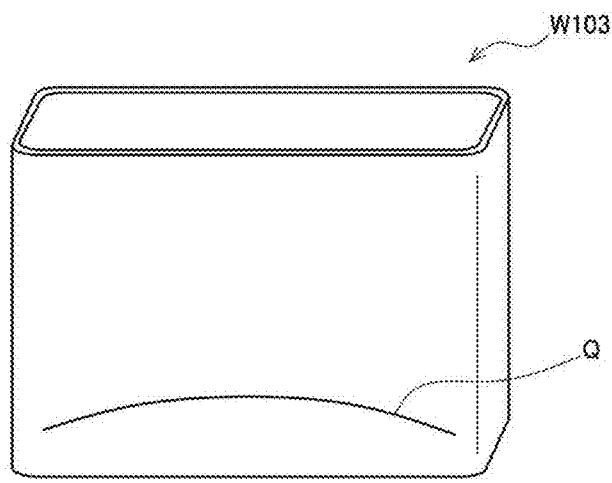
Figure 11:
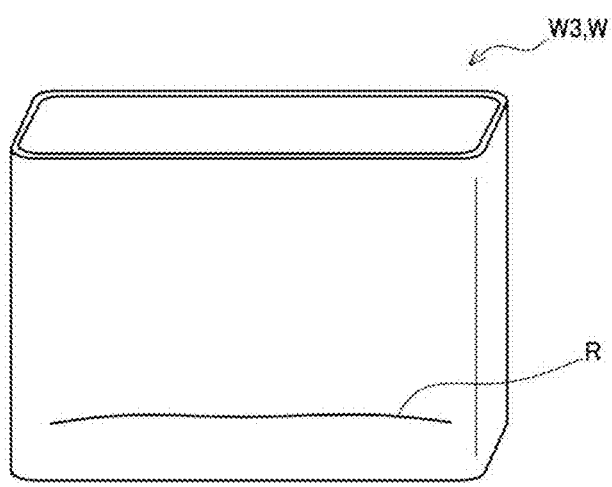

As described above, with the method of manufacturing a bottomed container according to this embodiment, the first press-drawing step S1 and the second press-drawing step S2 are performed to manufacture the box-section bottomed cylindrical container W3 with a bottom. Now, external features of the bottomed container W3 manufactured using the method of manufacturing a bottomed container according to this embodiment will be described. FIG. 11 is a view for explaining external features of the manufactured bottomed container W103, in which: FIG. 11(A) is a view for explaining external features of a bottomed container W103 manufactured by a conventional method of manufacturing a bottomed container; and FIG. 11(B) is a view for explaining external features of the bottomed container manufactured by the method of manufacturing a bottomed container according to this embodiment.

In the conventional method of manufacturing a bottomed container, as shown in FIG. 9, first, a press-drawing step is performed on the workpiece W101 in the state of a flat plate using the die 172A having the shaping hole 173A with an elliptical shape that expands outward over the entire circumference to form the cylindrical workpiece W102 with an elliptical cross-sectional shape. Then, a press-drawing step is performed using a die (not shown) having a shaping hole with a rectangular shape in which the corners of the rectangle are each formed into an arc shape, to form the box-section bottomed cylindrical container W103, as shown in FIG. 11(A). As manufactured by the conventional method of manufacturing a bottomed container, a thin and linear pattern Q is formed on a side of the bottomed container W103, as shown in FIG. 11(A). The pattern Q curves towards an open side of the top of the bottomed container W103. In FIG. 11(A), the pattern Q that appears on the side of the bottomed container W103 is shown schematically. In the bottomed container W103, there is no warping in the pattern Q portion, and the pattern Q on the side of the bottomed container W103 appears due to slight differences in the light reflection conditions on the side of the bottomed container W103. In the conventional method of manufacturing a bottomed container, the box-section bottomed cylindrical container W103 is formed by performing press-drawing on the cylindrical workpiece W102, which has an elliptical cross-sectional shape such that, when the square corner of the bottom of the workpiece W102 is drawn again, the central portion of the major axis direction of the elliptical shape at the portion expanding in the minor axis direction of the elliptical shape is elongated while undergoing significant plastic flow in the up-down direction, and the thin and linear pattern Q that curves toward the open side of the top of the bottomed container W103 is formed on the bottomed container W103.

On the other hand, as shown in FIG. 11(B), a thin and linear pattern R is formed on a side of the bottomed container W3 manufactured using the method of manufacturing a bottomed container according to this embodiment. The pattern R gently curves and extends in a direction approximately parallel to the longitudinal direction X, and also curves slightly toward the bottom side of the bottomed container W3 at the center portion in the longitudinal direction X. In FIG. 11(B), the pattern R that appears on the side of the bottomed container W3 is shown schematically. In the bottomed container W3, there is no warping in the pattern R portion, and the pattern R on the side of the bottomed container W3 appears due to slight differences in the light reflection conditions on the side of the bottomed container W3. In the method of manufacturing a bottomed container according to this embodiment, when the second press-drawing step S2 is performed, the corner portion of the bottom of the workpiece W2 is moved to the side of the bottomed container W3 (the workpiece W3) due to plastic flow. Since the bottom corner of the workpiece W2 is a portion that has been bent once, when the corner is moved to the side and flattened by the second press-drawing step S2, the corner will look different from the surrounding portions that have not been bent, and the pattern R will appear on the side of the bottomed container W3. The center portion of the bottom corner of the workpiece W2 in the longitudinal direction X is a portion formed tapering inward in the width direction Y by the first press-drawing step S1. Thus, when this portion is moved to the side and flattened by the second press-drawing step S2, as shown in FIG. 11(B), the thin and linear pattern R that gently curves and extends in a direction approximately parallel to the longitudinal direction X and also curves slightly toward the bottom side of the bottomed container W3 at the center portion in the longitudinal direction X appears on the side of the bottomed container W3 manufactured by the first press-drawing step S1 and the second press-drawing step S2.

[2-3. Effects of This Embodiment]

According to the method of manufacturing a bottomed container and the press system 1 according to this embodiment, the first shaping hole 73A is formed tapering inward in the width direction Y from both end sides to the center side in the longitudinal direction X, within the range of the width dimension Y that is larger than the width dimension YB, which is the width dimension Y of the second shaping hole 73B. As a result, in the first press-drawing step S1, in the workpiece W1, a tensile force is generated in the circumferential direction of the first shaping hole 73A at the center processed portion P2, which is the portion processed at the center of the first shaping hole 73A in the longitudinal direction X. Therefore, in the workpiece W1, the circumferential tensile force generated at the center processed portion P2 opposes the compressive force generated at the end processed portions P1, which are portions processed at ends of the first shaping hole 73A in the longitudinal direction X. This suppresses the volume of material processed at the center of the first shaping hole 73A in the longitudinal direction X from becoming excessive, and suppresses plastic flow toward the bottom of the workpiece W2. In addition, the first shaping hole 73A is formed tapering inward in the width direction Y from both end sides to the center side in the longitudinal direction X over the entire length in the up-down direction, within the range of the dimension in the width direction Y, which is larger than the width dimension YB of the second shaping hole 73B. As a result, the forces acting on the workpiece W1 at both ends and in the center of the first shaping hole 73A in the longitudinal direction X are adjusted throughout the entire first press-drawing step S1, and the volume of material processed at the center of the first shaping hole 73A in the longitudinal direction X is controlled so that it does not become excessive along the entire length in the up-down direction, thereby suppressing plastic flow to the bottom of the workpiece W2. In the second press-drawing step S2, the workpiece W2 in a state where plastic flow to the bottom is suppressed since the volume is suppressed from becoming excessive at the center in the longitudinal direction X, is passed through the second shaping hole 73B, which has a dimension in the width direction Y smaller than the first shaping hole 73A, and pressed and drawn to form the workpiece W2 into a box-section cylindrical shape state. In this way, the workpiece W is finally formed into the workpiece W3 in a box-section cylindrical shape state. Thus, with the method of manufacturing a bottomed container and the press system 1 according to this embodiment, in the first press-drawing step S1, workpiece W is press-formed, while excess volume at the center in the longitudinal direction X is suppressed and plastic flow to the bottom side is suppressed, and in the second press-drawing step, the workpiece W is pressed into a box-section cylindrical shape state by being drawn in the width direction Y. Therefore, with the method of manufacturing a bottomed container and the press system 1 according to this embodiment, it is possible to suppress warping at the bottom at the center of the workpiece W in the longitudinal direction X. In addition, in the method of manufacturing a bottomed container and the press system 1 according to this embodiment, the circumferential tensile force generated at the center processed portion P2 is opposed by the circumferential compressive force generated at the end processed portions P1, so buckling and wrinkling can also be suppressed at the center processed portion P2. In addition, with the method of manufacturing a bottomed container and the press system 1 according to this embodiment, it is possible to suppress warping at the bottom of the workpiece W. Therefore, in a case where the ironing process S3 is performed, it is also possible to suppress warping at the wall of the bottomed container as the workpiece W after the ironing process S3 is performed, and it is also possible to suppress of dimensional abnormalities at the corners of the bottom of the bottomed container.

As described above, with the method of manufacturing a bottomed container and the press system 1 according to this embodiment, by performing a multiple press-drawing step using multiple molds each having a long-hole-shaped shaping hole 73, it is possible to suppress warping at the bottom of the workpiece W when manufacturing a box-section bottomed cylindrical container by molding the workpiece W from a flat plate state to a rectangular cylindrical shape state with a bottom.

In addition, in the initial press-drawing step in which press-drawing is performed on the workpiece W in the flat plate state, the compressive force generated at the portions processed at both ends of the shaping hole 73 in the longitudinal direction X also increases. However, with the method of manufacturing a bottomed container and the press system 1 according to this embodiment, in the initial press-drawing step configured as the first press-drawing step S1, a circumferential tensile force can be generated at the center processed portion P2, which opposes the circumferential compressive force generated at the end processed portions P1. Therefore, even in the initial press-drawing step in which the bottom of the workpiece W is likely to warp, warping at the bottom of the workpiece W can be efficiently suppressed.

In addition, in the method of manufacturing a bottomed container and the press system 1 according to this embodiment, the first shaping hole 73A is formed tapering while curving inward in the width direction Y from both end sides to the center side in the longitudinal direction X, and is most narrow in the width direction Y at the center position CX in the longitudinal direction X. As a result, the method of manufacturing a bottomed container and the press system 1 according to this embodiment can generate a circumferential tensile force at the center processed portion P2 to oppose the circumferential compressive force generated at the end processed portions P1 more evenly. This makes it possible to suppress warping at the bottom of the workpiece W even more efficiently.

3. Modified Embodiments

In the above-mentioned embodiment, the method of manufacturing a bottomed container and the press system 1 are explained with reference to an example in which two press-drawing steps are performed as the multiple press-drawing steps, and the initial press-drawing step, which is the first press-drawing step, is configured as the first press-drawing step and the final press-drawing step, which is the second press-drawing step, is configured as the second press-drawing step. However, no limitation is intended. A method of manufacturing a bottomed container and a press system that performs three or more press-drawing steps as the multiple press-drawing steps may also be used. In addition, in the method of manufacturing a bottomed container and a press system that performs three or more press-drawing steps, the method of manufacturing a bottomed container and the press system may have a form in which the first press-drawing step and the second press-drawing step are performed multiple times. For example, the form shown in FIG. 12 may be implemented.

Figure 12:
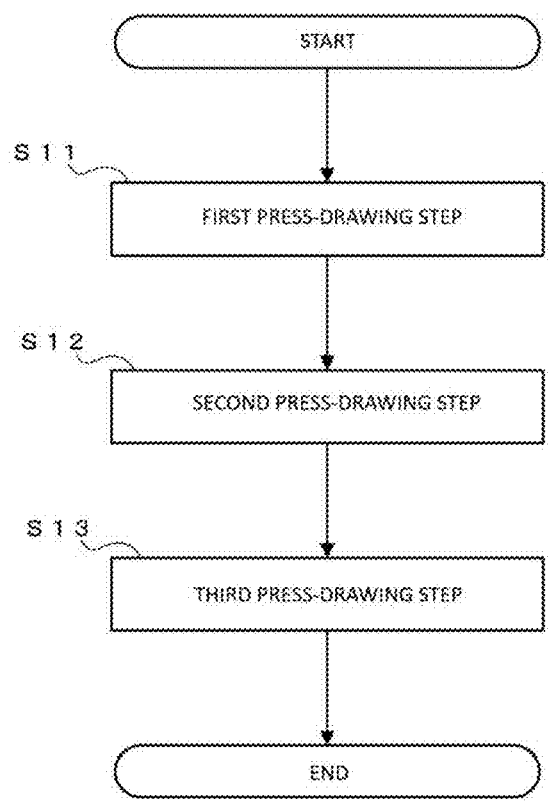
FIG. 12 is a flowchart showing a method of manufacturing a bottomed container according to a modified embodiment, and is a flowchart showing multiple press-drawing steps performed by a press system according to the modified embodiment.

FIG. 12 is a flowchart showing a method of manufacturing a bottomed container according to a modified embodiment, and is a flowchart showing multiple press-drawing steps performed by a press system according to the modified embodiment. FIG. 12 shows an example of a modified embodiment of the method of manufacturing a bottomed container, in which a box-section bottomed cylindrical container with a bottom is manufactured from a workpiece W in a flat plate state by performing multiple press-drawing steps using multiple molds each having a long-hole-shaped shaping hole. Further, FIG. 12 shows multiple press-drawing steps performed by a modified embodiment of the press system configured to form a box-section bottomed cylindrical container with a bottom from a workpiece W in a flat plate state by using multiple molds each having a long-hole-shaped shaping hole. The method of manufacturing a bottomed container according to this modified embodiment is implemented, for example, by performing multiple press-drawing steps on the workpiece W by using the press system 1, and the press system of this modified embodiment is configured as the press system 1 configured to perform the multiple press-drawing steps on the workpiece W. Therefore, the method of manufacturing a bottomed container according to this modified embodiment is configured as a method of manufacturing a bottomed container for manufacturing a box-section bottomed cylindrical container by forming the workpiece W from a flat plate state into a box-section cylindrical shape state by performing multiple press-drawing steps on the workpiece W by using multiple molds each including the die 72 and the punch 74 and each having the long-hole-shaped shaping hole 73. Further, the press system according to this modified embodiment is configured as the press system 1 configured to form the workpiece W from a flat plate state to a box-section cylindrical shape state having a bottom by performing multiple press-drawing steps on the workpiece W by using multiple molds each including the die 72 and the punch 74 and each having the long-hole-shaped shaping hole 73.

The method of manufacturing a bottomed container according to this modified embodiment includes three press-drawing steps as the multiple press-drawing steps. The press system according to this modified embodiment is configured to perform three press-drawing steps as the multiple press-drawing steps. In other words, as shown in FIG. 12, the method of manufacturing a bottomed container according to this modified embodiment includes a first press-drawing step S11, a second press-drawing step S12, and a third press-drawing step S13. The press system according to this modified embodiment is configured to perform the first press-drawing step S11, the second press-drawing step S12, and the third press-drawing step S13. The first press-drawing step S11 is the initial press-drawing step. The second press-drawing step S12 is a press-drawing step performed after the first press-drawing step S11. The third press-drawing step S13 is the final press-drawing step performed after the second press-drawing step S12. Note that, FIG. 12 does not show a form in which an ironing process is performed after the third press-drawing step S13 is complete, but an ironing process may be performed after the third press-drawing step S13 is complete. In other words, after the first to third press-drawing steps S11 to S13 are complete, an ironing process may be performed to reduce the thickness of the wall of the formed box-section bottomed cylindrical container.

The first press-drawing step S11 is one of the multiple press-drawing steps in the method of manufacturing a bottomed container according to this modified embodiment, excluding the final third press-drawing step S13, and constitutes the first press-drawing step in the present invention. The first press-drawing step S11 is one of the multiple press-drawing steps performed by the press system according to this modified embodiment, excluding the final third press-drawing step S13, and constitutes the first press-drawing step in the present invention.

The second press-drawing step S12 is the press-drawing step following the first press-drawing step of the multiple press-drawing steps in the method of manufacturing a bottomed container according to this modified embodiment, and constitutes the second press-drawing step in the present invention. The second press-drawing step S12 is the press-drawing step following the first press-drawing step of the multiple press-drawing steps performed by the press system according to this modified embodiment, and constitutes the second press-drawing step in the present invention. In other words, the second press-drawing step S12 is the press-drawing step following the first press-drawing step S11 as the first press-drawing step, and constitutes the second press-drawing step. In addition, the second press-drawing step S12 constitutes the second press-drawing step relative to the first press-drawing step S11, but constitutes the first press-drawing step relative to the third press-drawing step S13. Specifically, the second press-drawing step S12 is one press-drawing step of the multiple press-drawing steps, excluding the final third press-drawing step S13, and constitutes the first press-drawing step in the present invention with respect to the third press-drawing step S13.

The third press-drawing step S13 is the press-drawing step following the first press-drawing step of the multiple press-drawing steps in the method of manufacturing a bottomed container according to this modified embodiment, and constitutes the second press-drawing step in the present invention. The third press-drawing step S13 is the press-drawing step following the first press-drawing step of the multiple press-drawing steps performed by the press system according to this modified embodiment, and constitutes the second press-drawing step in the present invention. In other words, the third press-drawing step S13 is the press-drawing step following the second press-drawing step S12 as the first press-drawing step, and constitutes the second press-drawing step. The first to third press-drawing steps S11 to S13 are explained in more detail below.

Figure 13:
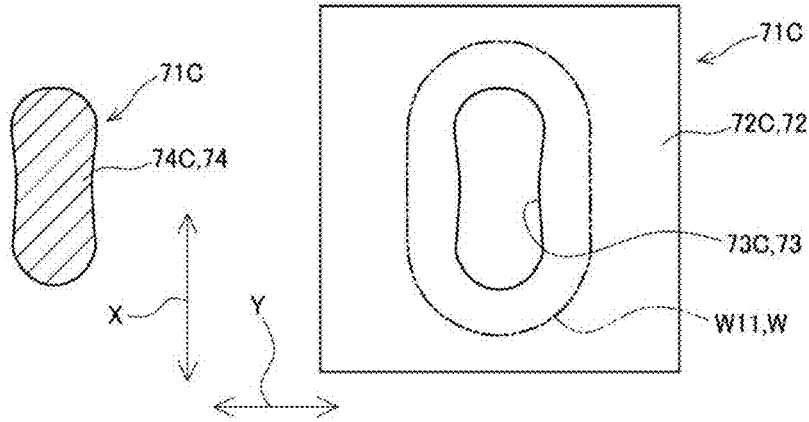
Figure 13:
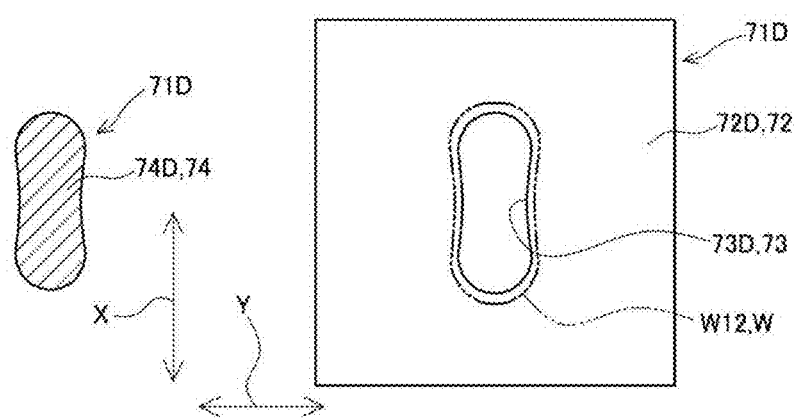
Figure 13:
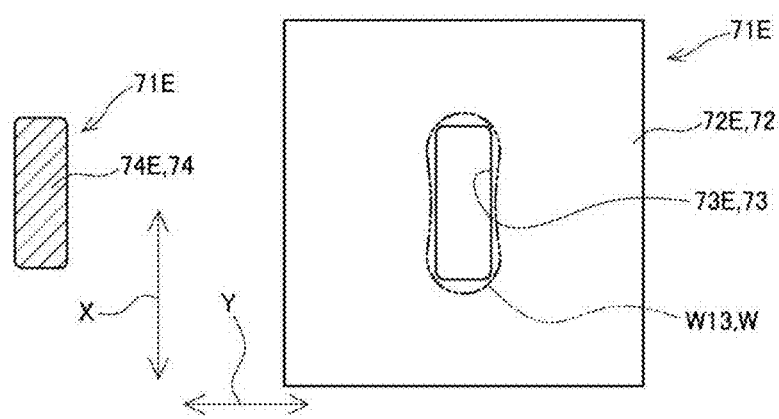

FIG. 13 is a view showing an example of a mold used in the press-drawing steps in the method of manufacturing a bottomed container according to the modified embodiment, and shows a mold in the press system according to the modified embodiment. More specifically, FIG. 13(A) is a cross-sectional plan view of a punch 74C and a plan view of a die 72C in a mold 71C used in the first press-drawing step S11. FIG. 13(B) is a cross-sectional plan view of a punch 74D and a plan view of a die 72D in a mold 71D used in the second press-drawing step S12. FIG. 13(C) is a cross-sectional plan view of a punch 74E and a plan view of a die 72E in a mold 71E used in the third press-drawing step S13. Note that, the dies 72C to 72E used in the first to third press-drawing steps S11 to S13 are each formed with the long-hole-shaped shaping hole 73. In FIGS. 13(A) to 13(C), the longitudinal direction X in which the shaping hole 73 extends in the long hole shape is indicated by the double-ended arrow X, and the width direction Y perpendicular to the longitudinal direction X is indicated by the double-ended arrow Y.

Referring to FIG. 13(A), the mold 71C used in the first press-drawing step S11 includes the die 72C and the punch 74C. The die 72C is provided as one of the multiple dies 72 mounted to the press system 1, and is configured as the die 72 used in the first press-drawing step S11. The punch 74C is provided as one of the multiple punches 74 mounted to the press system 1, and is configured as the punch 74 used in the first press-drawing step S11.

Referring to FIG. 13(A), the die 72C has the shaping hole 73C as the long-hole-shaped shaping hole 73 of the die 72. In other words, the die 72C has the shaping hole 73C formed in a long-hole shape in a plan view, and the shaping hole 73C has a dimension in the longitudinal direction X larger than a dimension in the width direction Y. For example, each end of the shaping hole 73C in the longitudinal direction X is formed in a semicircular shape. The shaping hole 73C is formed such that the shape of a portion of the shaping hole 73C in the circumferential direction, excluding the ends in the longitudinal direction X, tapers inward in the width direction Y from the ends to the center in the longitudinal direction X. In other words, the shape of the portion of the shaping hole 73C in the circumferential direction, excluding the both ends in the longitudinal direction X, is formed such that the dimension in the width direction Y gradually becomes smaller from the both ends to the center in the longitudinal direction X. Further, the shaping hole 73C is formed tapering inward in the width direction Y from the both ends to the center in the longitudinal direction X over the entire length in the up-down direction, which is the direction in which the shaping hole 73C extends through the die 72C. In addition, the shaping hole 73C is formed tapering while curving smoothly in an arc shape inward in the width direction Y from both end sides to the center side in the longitudinal direction X.

Referring to FIG. 13(A), the outer peripheral shape of the punch 74C is formed to correspond to the shape of the shaping hole 73C of the die 72C. Thus, the punch 74C is formed such that each end of the punch 74C in the direction parallel to the longitudinal direction X of the shaping hole 73C has a semicircular cross-sectional shape. Further, the punch 74C is formed such that the shape of a portion excluding the both ends of the semicircular cross-sectional shape in the circumferential direction smoothly curves and is recessed inward in a circular arc in the direction parallel to the width direction Y of the shaping hole 73C through in a circular arc from the two ends to the center in the direction parallel to the longitudinal direction X of the shaping hole 73C.

The first press-drawing step S11 constitutes the first press-drawing step. Therefore, the shaping hole 73C constitutes the first shaping hole in the present invention, and the mold 71C having the die 72C having the shaping hole 73C as the first shaping hole and the punch 74C corresponding to the die 72C constitute the first mold in the present invention.

The first press-drawing step S11 is performed using the mold 71C as the first mold having the shaping hole 73C as the first shaping hole. In the first press-drawing step S11, press-drawing is performed on the workpiece W11 serving as the workpiece W, which is supplied by the workpiece supply device 10 of the press system 1 and is in a flat plate state, by using the die 72C and the punch 74C. In FIG. 13(A), the workpiece W11 in the flat plate state is indicated by a double dotted line. In the first press-drawing step S11, the punch 74C pushes the workpiece W11 into the shaping hole 73C of the die 72C such that the workpiece W11 is formed into the workpiece W12 (see FIG. 13(B)) having a box-section cylindrical shape with a bottom. The workpiece W12 formed by the first press-drawing step S11 has a bottom and is formed into a cylindrical shape with a cross-sectional shape corresponding to the shape of the shaping hole 73C. In FIG. 13(B), the workpiece W12 in a plan view is represented by a double-dotted line.

Referring to FIG. 13(B), the mold 71D used in the second press-drawing step S12 includes the die 72D and the punch 74D. The die 72D is provided as one of the multiple dies 72 mounted to the press system 1 and is configured as the die 72 used in the second press-drawing step S12. The punch 74D is provided as one of the multiple punches 74 mounted to the press system 1 and is configured as the punch 74 used in the second press-drawing step S12.

Referring to FIG. 13(B), the die 72D has the shaping hole 73D as the long-hole-shaped shaping hole 73 of the die 72. That is, the die 72D has the shaping hole 73D that is formed in a long hole shape in a plan view, and the shaping hole 73D has a dimension in the longitudinal direction X larger than a dimension in the width direction Y. For example, both ends of the shaping hole 73D in the longitudinal direction X are each formed in a semicircular shape. The shaping hole 73D is formed such that the shape of a portion in the circumferential direction, excluding both ends in the longitudinal direction X, tapers while smoothly curving in a circular arc shape inward in the width direction Y from the ends to the center in the longitudinal direction X. Further, the shaping hole 73D is formed tapering from both end sides to the center side in the width direction Y along the entire length in the up-down direction, which is the direction in which the shaping hole 73D extends through the die 72D. In addition, the shaping hole 73D is formed with a smaller dimension in the width direction Y along the longitudinal direction X than the shaping hole 73C of the die 72C used in the first press-drawing step S11. Thus, in the shaping hole 73C of the die 72C used in the first press-drawing step S11, compared to the shaping hole 73D of the die 72D used in the second press-drawing step S12, the dimension in the width direction Y along the longitudinal direction X is formed larger and the dimension in the width direction Y over the entire length in the up-down direction is formed larger.

Referring to FIG. 13(B), the outer peripheral shape of the punch 74D is formed to correspond to the shape of the shaping hole 73D of the die 72D. Thus, the punch 74D is formed such that each end of the punch 74D in the direction parallel to the longitudinal direction X of the shaping hole 73D has a semicircular cross-sectional shape. Further, the punch 74D is formed such that the shape of the portion of the semicircular cross-sectional shape in the circumferential direction, excluding the two ends, smoothly curves and is recessed inward in a circular arc from the two ends to the center in the direction parallel to the longitudinal direction X of the shaping hole 73D, and then inward in a circular arc in the direction parallel to the width direction Y of the shaping hole 73D.

The second press-drawing step S12 constitutes the second press-drawing step relative to the first press-drawing step S11, which is the first press-drawing step. Therefore, in relation to the first press-drawing step S11, the shaping hole 73D constitutes the second shaping hole in the present invention, and the mold 71D including the die 72D having the shaping hole 73D as the second shaping hole, and the punch 74D corresponding to the die 72D constitutes the second mold in the present invention. In addition, the second press-drawing step S12 constitutes the first press-drawing step relative to the third press-drawing step S13, which is the second press-drawing step. Therefore, in relation to the third press-drawing step S13, the shaping hole 73D constitutes the first shaping hole in the present invention, and the mold 71D including the die 72D having the shaping hole 73D as the first shaping hole, and the punch 74D corresponding to the die 72D, constitutes the first mold in the present invention.

The second press-drawing step S12 is performed using the mold 71D serving as the second mold having the second shaping hole 73D serving as the second shaping hole, relative to the first press-drawing step S11. In addition, the second press-drawing step S12 is performed using the mold 71D serving as the first mold having the shaping hole 73D serving as the first shaping hole, relative to the third press-drawing step S13. In the second press-drawing step S12, the cylindrical workpiece W12 formed by the first press-drawing step is subjected to a press-drawing step using the die 72D and the punch 74D. In the second press-drawing step S12, the punch 74D pushes the workpiece W12 into the shaping hole 73D of the die 72D such that the workpiece W12 is formed into the workpiece W13 (see FIG. 13(C)) serving as the cylindrical workpiece W. Note that, the workpiece W13 formed by the second press-drawing step S12 has a bottom with an area that is equal to or smaller than that of the workpiece W12, and is formed into a shape that extends in a cylindrical shape with a cross-sectional shape corresponding to the shape of the shaping hole 73D. In FIG. 13(C), the workpiece W13 in a state as viewed in a plan view is indicated by a double dotted line.

Referring to FIG. 13(C), the mold 71E used in the third press-drawing step S13 includes the die 72E and the punch 74E. The die 72E is provided as one of the multiple dies 72 mounted to the press system 1 and is configured as the die 72 used in the third press-drawing step S13. The punch 74E is provided as one of the multiple punches 74 mounted to the press system 1 and is configured as the punch 74 used in the third press-drawing step S13.

Referring to FIG. 13(C), the die 72E has the shaping hole 73E as the long-hole-shaped shaping hole 73 of the die 72. In other words, the die 72E has the shaping hole 73E formed in the shape of a long hole in a plan view, and the shaping hole 73E has a dimension in the longitudinal direction X larger than a dimension in the width direction Y. The shaping hole 73E is formed in an elongated roughly rectangle shape extending in the longitudinal direction X. More specifically, the shaping hole 73E is formed in a shape in which the corners of the rectangle are each formed in an arc shape. Further, the shaping hole 73E is formed with a dimension in the width direction Y that is smaller than the shaping hole 73D of the die 72D used in the second press-drawing step S12, over the longitudinal direction X. In addition, the dimension of the shaping hole 73E in the width direction Y is smaller than that of the shaping hole 73D over the entire length in the up-down direction, which is the direction in which the shaping hole 73E extends through the die 72E. Thus, in the shaping hole 73D of the die 72D used in the second press-drawing step S12, compared to the shaping hole 73E of the die 72E used in the third press-drawing step S13, the dimension in the width direction Y along the longitudinal direction X is formed larger. In this modified embodiment, the third press-drawing step S13 constitutes the final press-drawing step. Because of this, the shape of the shaping hole 73E is a shape corresponding to the cross-sectional shape of the box-section bottomed cylindrical container that is ultimately manufactured after performing the multiple press-drawing steps in the method of manufacturing a bottomed container according to this modified embodiment.

Referring to FIG. 13(C), the outer peripheral shape of the punch 74E is formed to correspond to the shape of the shaping hole 73E of the die 72E. Thus, the punch 74E is formed to have a substantially rectangular cross-sectional shape that is elongated in a direction parallel to the longitudinal direction X of the shaping hole 73B.

The third press-drawing step S13 constitutes the second press-drawing step for the second press-drawing step S12 serving as the first press-drawing step. Thus, the shaping hole 73E constitutes the second shaping hole in the present invention, and the mold 71E including the die 72E having the shaping hole 73E serving as the second shaping hole and the punch 74E corresponding to the die 72E constitutes the second mold in the present invention.

The press-drawing step S13 that is performed third is performed using the mold 71E serving as the second mold having the shaping hole 73E serving as the second shaping hole, for the second press-drawing step S12. In the third press-drawing step S13, the cylindrical workpiece W13 formed by the second press-drawing step S12 is subjected to a press-drawing step using the die 72E and the punch 74E. In the third press-drawing step S13, the punch 74E pushes the workpiece W13 into the shaping hole 73E of the die 72E such that the workpiece W13 is formed into the workpiece W, which is a box-section bottomed cylindrical container with a bottom. By performing the third press-drawing step S13, the box-section bottomed cylindrical container formed as the box-section cylindrical workpiece W is manufactured. In this modified embodiment, the third press-drawing step S13 constitutes the final press-drawing step. Thus, the workpiece W molded through the third press-drawing step S13 is formed into the shape of the bottomed container manufactured by performing the multiple press-drawing steps in the method of manufacturing a bottomed container according to this modified embodiment, and constitutes the box-section bottomed cylindrical container having a bottom manufactured by the method of manufacturing a bottomed container according to this modified embodiment.

Figure 14:
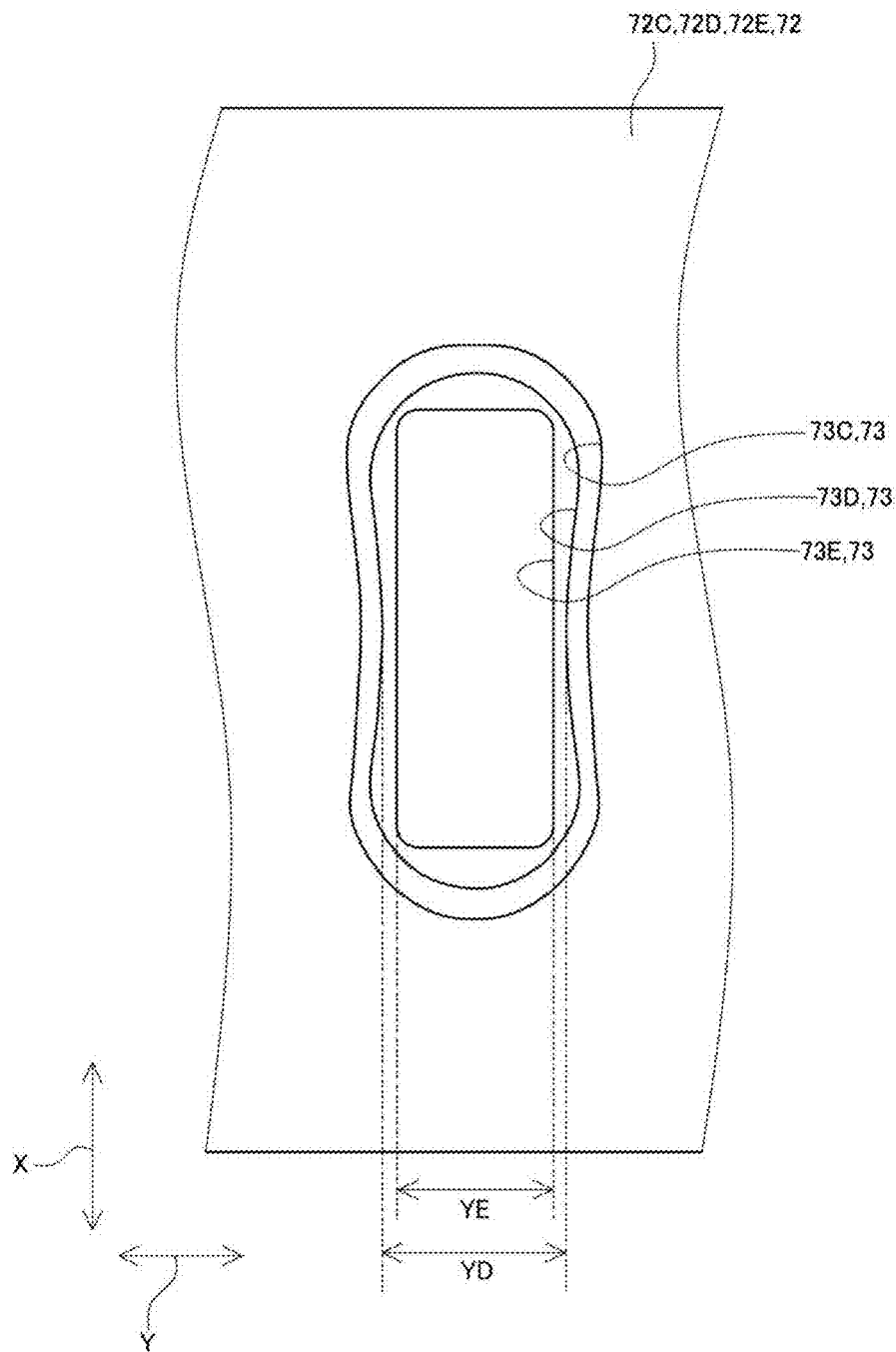
FIG. 14 is a view schematically showing a comparison of shaping holes of dies used in the multiple press-drawing steps in the method of manufacturing a bottomed container according to the modified embodiment, and schematically shows a comparison of shaping holes of dies used in the multiple press-drawing steps performed by the press system according to the modified embodiment.

Now, the relationship between the shapes of the shaping holes 73 of the dies 72 in the first press-drawing step S11, the second press-drawing step S12, and the third press-drawing step S13 will be described in more detail. FIG. 14 is a view schematically showing a comparison of the shaping holes 73 of the dies 72 used in the multiple press-drawing steps in the method of manufacturing a bottomed container according to the modified embodiment, and schematically shows a comparison of the shaping holes 73 of the dies 72 used in the multiple press-drawing steps performed by the press system according to the modified embodiment. More specifically, FIG. 14 schematically shows a comparison of the shaping hole 73C of the die 72C used in the first press-drawing step S11, the shaping hole 73D of the die 72D used in the second press-drawing step S12, and the shaping hole 73E of the die 72E used in the third press-drawing step S13. Of course, the die 72C, the die 72D, and the die 72E are not one die but separate and different dies. However, in FIG. 14, the die 72C, the die 72D, and the die 72E are shown schematically superimposed for the purpose of comparing the shaping hole 73C, the shaping hole 73D, and the shaping hole 73E.

First, the relationship between the shape of the shaping hole 73C of the die 72C used in the first press-drawing step S11 and the shape of the shaping hole 73D of the die 72D used in the second press-drawing step S12 will be described. In the relationship between the first press-drawing step S11 serving as the first press-drawing step and the second press-drawing step S12 serving as the second press-drawing step, the shaping hole 73C constitutes the first shaping hole, and the shaping hole 73D constitutes the second shaping hole. Referring to FIG. 14, the area of the shaping hole 73C constituting the first shaping hole is larger than the area of the shaping hole 73D constituting the second shaping hole over the entire circumference of the area. In other words, when the die 72C and the die 72D are superimposed, the outline of the shaping hole 73C does not overlap the outline of the shaping hole 73D in a plan view, and the shaping hole 73D is arranged inside the shaping hole 73C. Thus, the shaping hole 73C constituting the first shaping hole is formed with a larger dimension in the width direction Y along the longitudinal direction X than the shaping hole 73D constituting the second shaping hole. Further, the shaping hole 73C constituting the first shaping hole is formed with a larger dimension in the width direction Y than the shaping hole 73D constituting the second shaping hole over the entire length in the up-down direction, which is the direction in which the shaping hole 73C extends through the die 72C. More specifically, semicircular portions at both ends of the shaping hole 73C in the longitudinal direction X are formed to be large enough to surround semicircular portions at both ends of the shaping hole 73D in the longitudinal direction X from the outside over the entire length in the up-down direction. Further, a portion of the shaping hole 73C formed tapering inward in the width direction Y from both end sides to the center side in the longitudinal direction X is formed to be large enough to surround a portion of the shaping hole 73D formed tapering inward in the width direction Y from both end sides to the center side in the longitudinal direction X from the outside over the entire length in the up-down direction. Thus, the shaping hole 73C constituting the first shaping hole is formed with a larger dimension in the width direction Y than the shaping hole 73E constituting the second shaping hole over the entire length in the up-down direction.

Next, the relationship between the shape of the shaping hole 73D of the die 72D used in the second press-drawing step S12 and the shape of the shaping hole 73E of the die 72E used in the third press-drawing step S13 will be described. In the relationship between the second press-drawing step S12 serving as the first press-drawing step and the third press-drawing step S13 serving as the second press-drawing step, the shaping hole 73D constitutes the first shaping hole and the shaping hole 73E constitutes the second shaping hole. Referring to FIG. 14, the area of the shaping hole 73D constituting the first shaping hole is larger than the area of the shaping hole 73E constituting the second shaping hole over the entire circumference of the area. In other words, when the die 72D and the die 72E are superimposed, the outline of the shaping hole 73D does not overlap the outline of the shaping hole 73E in a plan view, and the shaping hole 73E is arranged inside the shaping hole 73D. Thus, the shaping hole 73D constituting the first shaping hole is formed with a larger dimension in the width direction Y than the shaping hole 73E constituting the second shaping hole along the longitudinal direction X. Further, the shaping hole 73D constituting the first shaping hole is formed with a larger dimension in the width direction Y than the shaping hole 73E constituting the second shaping hole over the entire length in the up-down direction, which is the direction in which the shaping hole 73D extends through the die 72D. More specifically, first, the shape of the shaping hole 73E is approximately rectangular, and a width dimension YE, which is the dimension of the shaping hole 73E in the width direction Y, is set to a certain dimension. The width dimension YE of the shaping hole 73E is set to a certain dimension over the entire length in the up-down direction, which is the direction in which the shaping hole 73E extends through the die 72E. On the other hand, semicircular portions at both ends of the shaping hole 73D in the longitudinal direction X are formed to be large enough to surround outer sides of the ends of the shaping hole 73E in the longitudinal direction over the entire length in the up-down direction. Furthermore, a portion of the shaping hole 73D in the circumferential direction excluding both ends in the longitudinal direction X is formed such that the dimension in the width direction Y gradually decreases from the ends to the center in the longitudinal direction X over the entire length in the up-down direction to become a width dimension YD, which is the smallest dimension at the center in the longitudinal direction X. The width dimension YD, which is the smallest dimension in the width direction Y of the portion of the shaping hole 73D excluding both ends in the longitudinal direction X, is larger than the width dimension YE of the shaping hole 73E over the entire length in the up-down direction. Thus, the shaping hole 73D constituting the first shaping hole is formed with a larger dimension in the width direction Y than the shaping hole 73E constituting the second shaping hole over the entire length in the up-down direction.

With the method of manufacturing a bottomed container and the press system according to the modified embodiment described above, the shaping hole 73C of the die 72C used in the first press-drawing step S11 is formed tapering inward in the width direction Y from both end sides to the center side in the longitudinal direction X within a range in which the dimension in the width direction Y is larger than the shaping hole 73D of the die 72D used in the second press-drawing step S12. With this configuration, in the first press-drawing step S11, a tensile force is generated in the circumferential direction of the shaping hole 73C at the portion of the workpiece W11 that is processed at the center in the longitudinal direction X of the shaping hole 73C. Thus, the tensile force generated at the portion of the workpiece W11 that is processed at the center in the longitudinal direction X of the shaping hole 73C opposes the compressive force generated at the portions processed at both ends of the shaping hole 73C in the longitudinal direction X. This suppresses the volume of material processed at the center of the shaping hole 73C from becoming excessive, and suppresses plastic flow toward the bottom of the workpiece W12. Thus, it is possible to suppress warping at the bottom of the central portion of the workpiece W12 in the longitudinal direction X.

Furthermore, with the method of manufacturing a bottomed container and the press system according to this modified embodiment, the shaping hole 73D of the die 72D used in the second press-drawing step S12 is formed tapering inward in the width direction Y from both end sides to the center side in the longitudinal direction X within a range in which the dimension in the width direction Y is larger than the shaping hole 73E of the die 72E used in the third press-drawing step S13. With this configuration, in the second press-drawing step S12, a tensile force is generated in the circumferential direction of the shaping hole 73D at a portion of the workpiece W12 that is processed at the center in the longitudinal direction X of the shaping hole 73D. Thus, the tensile force generated at the portion of the workpiece W12 that is processed at the center in the longitudinal direction X of the shaping hole 73D opposes the compressive force generated at the portions processed at both ends of the shaping hole 73D in the longitudinal direction X. This suppresses the volume of material processed at the center of the shaping hole 73D from becoming excessive, and suppresses plastic flow toward the bottom of the workpiece W13. Thus, it is possible to suppress warping at the bottom of the central portion of the workpiece W13 in the longitudinal direction X.

As described above, with the method of manufacturing and a bottomed container and the press system according to this modified embodiment, by performing multiple press-drawing steps by using multiple molds each having the long-hole-shaped shaping hole 73, warping at the bottom of the workpiece W can be suppressed when manufacturing a box-section bottomed cylindrical container by molding the workpiece W from a flat plate state to a box-section cylindrical shape state with a bottom.

The above describes the embodiments and variations of the present invention, but the present invention is not limited to the above embodiments and variations and can be applied with various modifications as long as they are described in the scope of the claims.

For example, the first press-drawing step and the second press-drawing step described in the above embodiment and modified embodiment are not limited to the method of manufacturing a bottomed container and press system configured to performs two or three press-drawing steps and can also be applied to a method of manufacturing a bottomed container and a press system configured to perform four or more press-drawing steps. Further, the first press-drawing step and the second press-drawing step described in the above embodiment and modified embodiment are not limited to a configuration in which multiple press-drawing steps are performed using the press system 1 including the transfer press device 50 including multiple molds and can also be applied to a configuration in which multiple press-drawing steps are performed using a press system including multiple single-stroke presses each having a mold. In the case of a press system including multiple single-stroke presses performing multiple press-drawing steps, the workpiece may be transferred between the presses by an operator, or may be transferred by a workpiece transfer machine.

REFERENCE NUMERALS

1 Press system
71A First mold
71B Second mold
72, 72A, 72B Die
73 Shaping hole
73A First shaping hole
73B Second shaping hole
W, W1, W2, W3 Workpiece
S1 First press-drawing step
S2 Second press-drawing step

What is claimed is:

1. A method of manufacturing a bottomed container, for manufacturing a bottomed box-section cylindrical container by molding a workpiece from a flat plate state to a box-section cylindrical shape state having a bottom by performing multiple press-drawing steps by using multiple molds each having a long-hole-shaped shaping hole, the method comprising:
    a first press-drawing step configured as at least one press-drawing step of the multiple press-drawing steps, excluding a final press-drawing step, the first press-drawing step being performed by using a first mold including a die including a first shaping hole as the long-hole-shaped shaping hole and a punch configured to push the workpiece into the first shaping hole; and
    a second press-drawing step configured as a press-drawing step following the first press-drawing step of the multiple press-drawing steps, the second press-drawing step being performed by using a second mold including a second shaping hole as the long-hole-shaped shaping hole, wherein the first shaping hole is formed having a larger dimension in a width direction than the second shaping hole along an entire length of the first shaping hole in an up-down direction, the width direction being a direction perpendicular to a longitudinal direction in which the first shaping hole extends in a long hole shape, the up-down direction being a direction in which the first shaping hole extends through the die, the first shaping hole is formed to taper inward in the width direction from both end sides to the toward the first shaping hole center in the longitudinal direction along the entire length of the first shaping hole in the up-down direction, and an outer peripheral shape of the punch is formed in a shape corresponding to a shape of the first shaping hole, which tapers inward in the width direction from both end sides to the center in the longitudinal direction along the entire length of the first shaping hole in the up-down direction, and a cross-sectional shape of the punch is formed curved and recessed inward in a direction parallel to the width direction from end sides toward the punch center in a direction parallel to the longitudinal direction, along the entire length in the up-down direction.

2. The method of manufacturing a bottomed container as claimed in claim 1, wherein the first press-drawing step is configured as an initial press-drawing step of the multiple press-drawing steps.

3. The method of manufacturing a bottomed container as claimed in claim 1, wherein the first shaping hole is formed tapered while curving inward in the width direction from both end sides to the center in the longitudinal direction, and is formed most tapered inward in the width direction at a center position in the longitudinal direction.

4. A press system for forming a bottomed box-section cylindrical container by molding a workpiece from a flat plate state to a box-section cylindrical shape state having a bottom by performing multiple press-drawing steps by using multiple molds each having a long-hole-shaped shaping hole, the press system comprising:

a first press unit including:

a first mold including a die having a first shaping hole as the long-hole-shaped shaping hole, and a punch configured to press the workpiece into the first shaping hole, the first press unit being configured to perform a first press-drawing step configured as at least one press-drawing step of the multiple press-drawing steps, excluding a final press-drawing step by using the first mold; and a second press unit including a second mold having a second shaping hole as the long-hole-shaped shaping hole, and being configured to perform a second press-drawing step configured as a press-drawing step following the first press-drawing step of the multiple press-drawing steps by using the second mold, wherein the first shaping hole is formed having a larger dimension in a width direction than the second shaping hole along an entire length of the first shaping hole in an up-down direction, the width direction being a direction perpendicular to a longitudinal direction in which the first shaping hole extends in a long hole shape, the up-down direction being a direction in which the first shaping hole extends through the die, the first shaping hole is formed to taper inward in the width direction from both end sides toward the first shaping hole center in the longitudinal direction along the entire length of the first shaping hole in the up-down direction, and an outer peripheral shape of the punch is formed in a shape corresponding to a shape of the first shaping hole, which tapers inward in the width direction from both end sides to the center side in the longitudinal direction along the entire length of the first shaping hole in the up-down direction, and a cross-sectional shape of the punch is formed curved and recessed inward in a direction parallel to the width direction from end sides toward the punch center in a direction parallel to the longitudinal direction, along the entire length in the up-down direction.

5. The press system as claimed in claim 4, wherein the first press unit performs the first press-drawing step configured as an initial press-drawing step of the multiple press-drawing steps by using the first mold.

6. The press system as claimed in claim 4, wherein the first shaping hole is formed tapered while curving inward in the width direction from both end sides to the first shaping hole center in the longitudinal direction, and is formed most tapered inward in the width direction at a center position in the longitudinal direction.

* * * * *